United States Patent
Imai et al.

(10) Patent No.: US 8,757,346 B2
(45) Date of Patent: Jun. 24, 2014

(54) MEDICAMENT FILLING MACHINE

(75) Inventors: Takafumi Imai, Osaka (JP); Kazunori Tsukamoto, Osaka (JP)

(73) Assignee: Yuyama Mfg. Co., Ltd., Toyonaka-shi (JP)

( * ) Notice: Subject to any disclaimer, the term of this patent is extended or adjusted under 35 U.S.C. 154(b) by 260 days.

(21) Appl. No.: 13/138,447

(22) PCT Filed: Feb. 12, 2010

(86) PCT No.: PCT/JP2010/052039
§ 371 (c)(1),
(2), (4) Date: Oct. 17, 2011

(87) PCT Pub. No.: WO2010/095563
PCT Pub. Date: Aug. 26, 2010

(65) Prior Publication Data
US 2012/0024423 A1    Feb. 2, 2012

(30) Foreign Application Priority Data

Feb. 17, 2009 (JP) .................................. 2009-033681

(51) Int. Cl.
*B65G 11/00* (2006.01)
(52) U.S. Cl.
USPC ................. 193/2 R; 193/3; 198/532; 221/172
(58) Field of Classification Search
USPC ........... 193/2 R, 3, 34; 198/531, 532, 550.01, 198/562; 221/156, 171, 172
See application file for complete search history.

(56) References Cited

U.S. PATENT DOCUMENTS

| 4,693,355 | A | * | 9/1987 | Bochi et al. | ............ 193/2 R |
| 6,250,514 | B1 | * | 6/2001 | Hansson | ............ 222/462 |
| 6,605,785 | B1 | * | 8/2003 | Muramiya | ............ 177/25.18 |
| 7,100,796 | B1 | | 9/2006 | Orr et al. | |

FOREIGN PATENT DOCUMENTS

| FR | 2802903 | 6/2001 |
| JP | 3-38817 U | 4/1991 |
| JP | 1993-085720 | 11/1993 |
| JP | 2009-291 | 1/2009 |

* cited by examiner

*Primary Examiner* — Leslie A Nicholson, III
*Assistant Examiner* — Keith R Campbell
(74) *Attorney, Agent, or Firm* — Masuvalley & Partners

(57) ABSTRACT

This invention aims at providing a medicine filling device which can supply the vial container in a smooth manner without getting caught in the vial supply means designed to supply the empty vial container, before filling the drug. The supply means 60 has the structure that the vial container can pass in it and the vial container passage 68. The vial container passage 68 has the passage width goes on tapering from the region on the upper end side towards the region on the lower end side. The vial container passage 68 also has the inner wall surface 62 *a*, 62 *b* and 62 *c*. The vial container passage 68 has the passage portion 68 *b* being steeper than the inclination of the inner wall surface 62 *a* and the taper ratio of the passage portion 68 *b* being smaller than the taper ratio of the passage width in the receiving portion 62. Therefore, the center of gravity of the vial container exceeds the border of the receiving portion 62 *a* and the passing portion 62 *b*, the posture of the vial container switches to the standing state.

7 Claims, 19 Drawing Sheets

FIG. 4
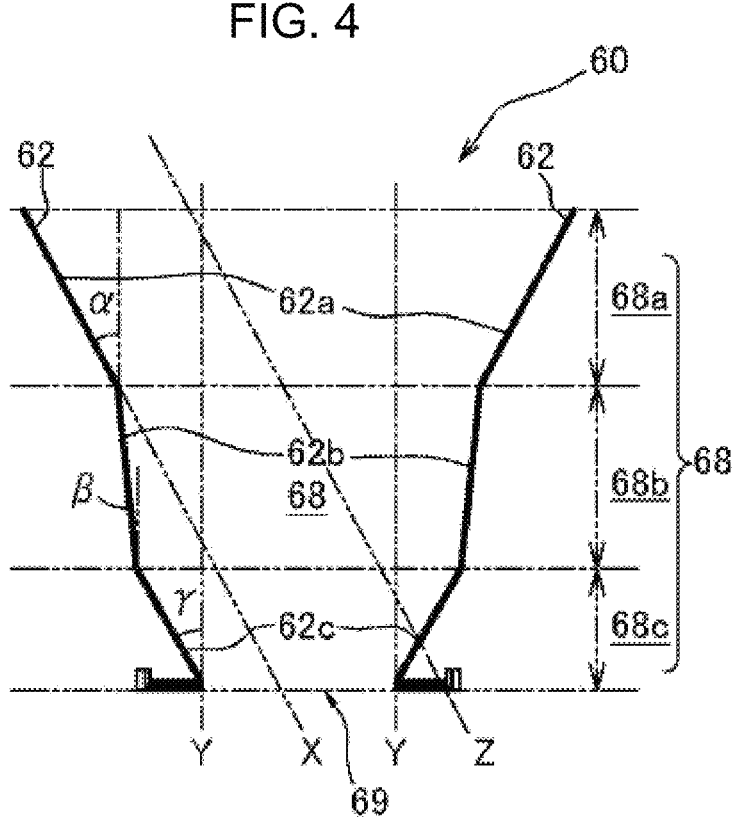
(a)
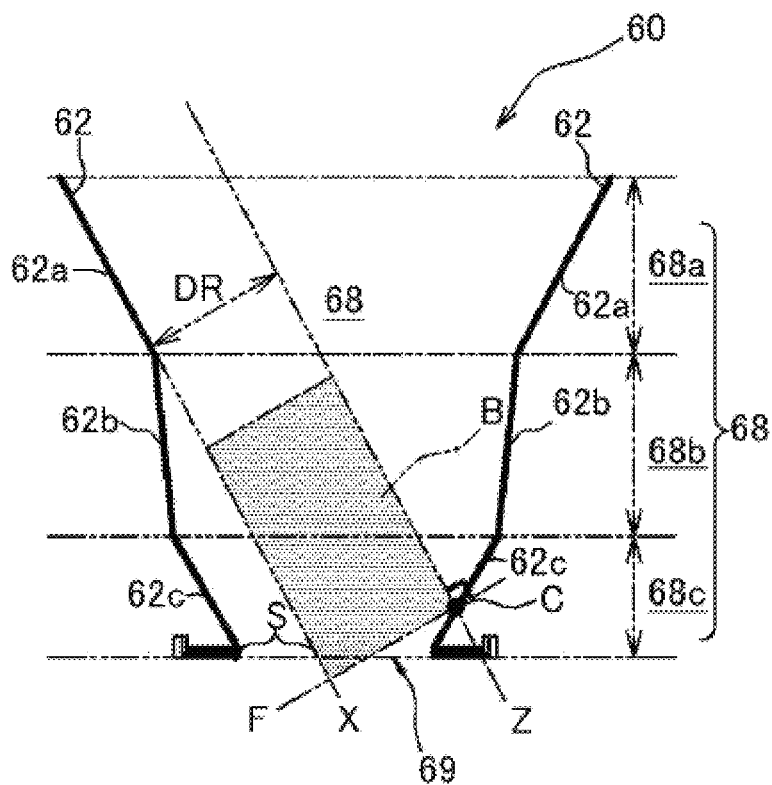
(b)

MEDICAMENT FILLING MACHINE

This application claims priority under 35 U.S.C. §371 as a National Stage application of international application number PCT/JP2010/052039, filed Feb. 12, 2010, entitled "MEDICINE FILLING DEVICE," which claims priority to Japanese Patent Application No. JP2009-033681 Filed on Feb. 17, 2009, which are incorporated herein by reference.

TECHNICAL FIELD

This invention is related to the Medicine Filling Device, which fills the medicine in the vial containers, and it has a characteristic that there is a vial container supply means to supply the vial containers in a standing state.

BACKGROUND OF THE INVENTION

Traditionally, as mentioned in JP Publication 2009-000291, a device transfers the vial container from the stocker to the specified filling position and to fill the medicine in this. In such types of devices, it is necessary that the vial container pulled out from the stocker, is in a standing state with the open end facing upward, during its transportation on the passage to the drug filling place. Here, in order to eliminate the problems concerned, a vial container supply device, as U.S. Pat. No. 7,100,796 given below, is adopted in the medicine filling device.

The vial container supply device which is disclosed in U.S. Pat. No. 7,100,796 has a receiving portion which receives the vial containers which come falling vertically, and a slanting portion and flap which are designed in the lower direction, and a platform which is designed on the lower direction of these.

In this supply device, the vial container is inserted in the receiving portion, and the vial container is supplied through the opening designed in the lower side of the receiving portion, in a standing state, and is moved on to the platform along the slanting portion. At this time the vial container is softly delivered to the platform, while maintaining its standing position, so that the flap which has the spindle attached to it, is in contact with the vial container.

SUMMARY OF THE INVENTION

The Vial Container Supply Device which is disclosed in U.S. Pat. No. 7,100,796, has the inner area of the receiving portion which is tapering from the first opening designed in the upper direction of the receiving portion which is the receptor for the vial container, to the 2nd opening portion which is designed in the lower side of the receiving portion for the supply of the vial container, and it goes on becoming narrow gradually. For this reason, in case of making it into a structure which is as disclosed in U.S. Pat. No. 7,100,796, there is a possibility that the vial container may be held inside the receiving portion and get blocked there, depending on the angle of the vial container, at the time of falling in the receiving portion.

Here, this invention aims at providing a medicine filling device which can supply the vial container in a smooth manner without getting caught in the vial supply means which are designed to supply the empty vial container, before filling the drug.

The drug filling device of this invention which is provided for the purpose of resolving the problem mentioned above, has a vial container path where in the vial container can pass from the upper direction towards the lower direction, and it is a vial container passage where the width of the passage goes on decreasing from the region of the upper direction towards the region of the lower direction. In the drug filling device of this invention, the vial container passage is positioned in the lower side of the receiving portion which receives the vial container, and the receiving area of the same, and it is has a passage portion where the vial container passes as it falls from the previously described receiving portion, and in the lower side of the said passage, it has a supplying portion which can supply the vial container which has come falling from the previously described passage portion, by discharging it and supplying it to the next process and it has a supply window which is designed in the previously mentioned supply portion, which can supply the vial container by releasing it in the lower direction. Further more, in the medicine filling device of this invention, the width of the path of the vial container passage in the previously described passage portion, is larger than the width of the passage in the previously described supply port, and the ratio of reduction of the width of the passage or the taper ratio, in the previously described passage portion is smaller than the ratio of reduction of the width of the passage in the previously described passage portion.

Further, in this invention, the "ratio of gradual reduction or the taper ratio of the passage width" indicates the ratio of change in the width of the passage which gradually goes on decreasing and there are cases when it is zero or minus. In case the "ratio of gradual reduction of the width of the passage" is zero, then there is no change in the width of the passage in the upward and downward direction. Moreover, in case the "ratio of gradual reduction of the width of the passage" is minus, it will be a state when the width of the passage will go on increasing gradually towards the lower direction.

The medicine filling device of this invention has a guide portion designed in the supply portion, and the passage width of the portion from the passage side to the supply window is preferred to be a width which goes on gradually reducing as per the previously described guide portion. Further, in the medicine filling device of this invention, the inner wall surface of the vial container supplying means is indented at the boundary portion of the receiving portion and the passage portion, and the inclination between the upper end and the lower end of the previously mentioned passage portion, is preferred to be closer to vertical than the inclination between the upper end and the lower end of the previously mentioned receiving portion.

The medicine filling device of this invention, has a pair of passage composition (Called below, respectively as the "Passage structure E1" and the "Passage structure E2") where the vial container supply means are placed opposite each other, and it is alright if the vial container supplying passage is formed between the said pair of Passage structure E1, E2. In case of regarding it as the concerned composition, it is desired that out of the previously described pair of passage structures E1, E2, a receiving structure portion which forms the receiving portion of the vial container passage should be present on at least one side, and a passage structure portion which forms the passage portion having an inclination which differs from that of the said receiving portion composition, and a supply structure portion which forms the supply portion whose inclination differs from that of the said passage structure portion, should be designed. In the medicine filling device of this invention, it is desired that in both the passage structure E1, E2, the previously described receiving structure portion, or the passage structure portion, supply structure portion is designed. Further, the medicine filling device of this invention, can have the pair of passage structure E1, E2 which are placed opposite to each other, in a further closer or farther distance, due to which it is possible to adjust the width of the passage of the vial container passage, and it is also alright even if the width of the passage can be adjusted depending on the size of the vial container which is supplied from the supply portion.

Further, as another form of the medicine filling device mentioned above, one can also have a structure (for example, a composition as shown in FIG. 19) in which one considers the contact surface X which is in touch with the inner wall of the portion that constitutes the receiving portion in the vial container supply means, and the inner wall surface of the passage portion which is designed in the lower side of the previously described receiving portion, can be made into a composition such that it is on the outer side of the vial container supplying passage which is farther than the previously described contact surface X.

Moreover, in the medicine filling device which is mentioned above, if we assume a vertical plane Y which runs along the edge of the supply port which is designed in the supply portion of the vial container supplying means, then it is desired that the inner wall of the passage portion is placed farther than the previously described vertical place Y, on the outer side of the vial container passage. In other words, it is preferred that the vial container passage is the one which is posted on the outer side in the passage portion, such that it is farther out than the contact surface X or the vertical place Y.

In the drug filling device mentioned above, it is desired that the contact surface X of the receiving portion is the one which passes through the middle of the supply port designed in the supply portion. Further, by forcing the vial container to enter the receiving portion, if we assume that the vial container goes down as it is in line with the contact surface X of the receiving portion, then, it is desired that the plane (Inner wall surface of the vial container passage) on which the vial container impacts after falling along the receiving portion, should be inclined towards the supply port (For example, a structure as shown in FIG. 19).

To state in further details, if we consider the external diameter of the body portion of the vial container to be DR, then, if the vial container falls down straight in line along the contact surface X of the receiving portion, the vial container will pass through the portion between the contact surface X of the receiving portion and the surface which is separated by a distance of the external diameter DR from this contact surface X, (Called also as the "hypothetical surface Z" below), and the vial container will have an impact at the portion where the inner wall surface of the vial container passage and the hypothetical surface Z crosses. For this reason, the portion which crosses the hypothetical surface Z in the inner wall surface of the vial container passage is desired to be so inclined towards the supply port that it can guide the impacted vial container towards the supply port.

Further the inner wall surface of the vial container passage which crosses the above mentioned hypothetical surface Z is preferred to have a steeper inclination than the surface which is direct to the hypothetical surface Z.

The vial container supply means with which the medicine filling device of this invention is equipped, has a structure such that the passage width of the vial container passage designed on the inner side, goes on gradually tapering from the region of the upper direction to the region of the lower direction. Further, the ratio of gradual reduction or tapering in the passage width of the vial container passage, is such that the passage portion which is on the lower side is smaller than the receiving portion on the insertion side (Upper direction) of the vial container. In other words, the vial container passage has the inclination of the wall which forms the passage portion to be steeper than the walls which form the receiving portion. Therefore, in the medicine filling device of this invention, even if we assume that at the point of time when the vial container is inserted in the receiving portion, it gets horizontal, once the center of gravity of the vial container exceeds the border of the receiving portion and the passing portion, the posture of the vial container switches to the standing state as per the change in the inclination of the receiving portion and the passage portion. Further, in the medicine filling device of this invention, the passage width of the vial container passage in the previously mentioned passage portion is greater than the supply window which is designed for the supply of the vial container, and the vial container, enters the passage portion in a smooth manner, without hitting the wall which forms the vial container passage and turns into a standing state. Moreover, before filling the medicine, the bottom which is on the lower side of the vial container, is obstructed and the upper side is opened in order to fill the drug. Therefore, as is described before, if the vial container falls into the vial container passage, the vial container is supplied in a state where the opening is in the upward direction.

Further the medicine filling device of this invention has a guide portion designed in the supply portion, as mentioned above and the structure is made such that the width of the passage from the passage portion side to the supply port goes on gradually reducing, as per this supply portion, and the vial container which has turned into a perpendicular form is guided to the supply window in a smooth manner, and it can thus be supplied.

As mentioned above, the medicine filling device of this invention, has the inner wall surface of the vial container supply means, indented at the boundary of the receiving portion and the passage portion and the inclination between the upper end and the lower end of the previously described passage portion, can be made closer to vertical as compared to the inclination between the upper and lower side of the previously described receiving portion. If such a structure is made, the ratio of gradual reduction of the passage width in the passage portion, is certainly smaller than the ratio of gradual reduction of the passage width in the receiving portion, due to which it is possible to supply the vial container in a standing state in a smooth manner.

Here, by designing a pair of opposite facing inner walls in the medicine filling device of this invention, it is possible to form a vial container passage between them, and by all means, the inner wall surface should be enclosed in a square. Further, if the width of the passage of the vial container passage is reduced gradually in the lower direction as mentioned above then it is alright if one of the inner wall surfaces which are placed opposite to each other is indented, and the other can be planar, or something similar, as long as it can prevent the jumping out of the vial container from the vial container passage. By making such a structure, it is possible to simplify the composition of the inner wall surface, due to which it is possible to simplify the production. Further, the "inner wall surface" which is mentioned above, can be formed in such a manner that it forms a consecutive state from the receiving portion till the discharge portion, via the passage portion, and it is alright if the portion from the receiving portion till the discharge portion, via the passage portion, is divided into many parts. Moreover, "the opposite facing pair of inner wall surfaces" are not just the opposite facing pair of inner wall surfaces from the receiving portion till the discharge portion, via the passage portion, for example, it also contains the pair of inner wall surfaces which form the portion equivalent to the receiving portion, and the pair of inner wall surfaces which form the portion equivalent to the passage portion, and the pair of inner wall surfaces which form the portion equivalent to the supply portion, are respectively those which face opposite to each other.

In the medicine filling device of this invention, instead of having one of the inner wall surfaces which are placed opposite to each other, as mentioned above to be bent, it is also possible to have the indentation of both of the pair of wall surfaces which form the vial container passage such that the width of the passage of the vial container passage goes on gradually decreasing in the lower direction. Particularly, the vial container supply means has a pair of passage structure (Passage structure E1, E2) which are placed opposite to each other, and in the case where it is regarded that the vial container passage is formed between the said pair of passage structures, then it is possible to design a portion which forms the receiving portion of the vial container passage, and the portion which forms the passage portion whose inclination differs from that of the said receiving portion, and the portion which forms the supply portion and whose inclination differs from that of the said passage portion, in the respective pair of passage structures described above. By doing such a composition, it is possible to supply the vial container in a standing state and in a smooth manner even if the vial container is inserted from whichever direction, of the flow pass structures.

Further, in the medicine filling device of this invention, it is possible to adjust the passage width of the vial container passage by keeping the pair of passage structures which are placed opposite to each other, closer or farther away from each other, and by adjusting the width of the passage of the vial container passage as per the size of the vial container to be supplied from the supply portion, it is possible to handle the vial containers of various sizes. Moreover, in the medicine filling device of this invention, it is alright if both of the pair of passage structures which are placed opposite to each other are moved close or away from each other, or even if a single one is operated.

Further, as mentioned above as another form of the medicine filling device, it is also possible that the inner wall surface of the passage portion is farther outside the vial container passage as compared to the contact plane X which is in touch with the inner wall of the portion that constitutes the receiving portion in the vial container supply means. If such a composition is made, then, it is possible to retain the space necessary for the change in posture of the vial container to come into a standing position, in the passage portion which is designed in the lower side of the receiving portion. Moreover, similarly, if the inner wall surface of the passage portion, is placed at a distance which is farther away from the perpendicular surface Y, which passes along the edge of the supply port, it is possible to ensure sufficient space so as to cause the vial container which falls between the receiving portion and the passage portion, to change the posture to that of a standing state. Hence, even in cases when such a structure is employed, it is possible that the vial container is supplied to the next process, while the open portion is facing upward and it is in a standing state.

Further, by designing the vial container supply means such that the contact plane X of the receiving portion, passes through the center of the supply port which is designed in the supply portion, and even if we assume that the vial container is falling along the contact plane X in a smooth manner, a gap is formed between the supply port and the vial container. Hence, by adopting such a configuration, it is possible to provide a medicine filling device in which the vial container is supplied smoothly without getting caught in the supply port portion.

Moreover, as mentioned above if we consider a structure, in which the surface (the inner wall of the vial container passage) on which the vial container falling straight from the contact plane X of the receiving portion collides, is slanted towards the supply port, and temporarily, even if we consider that the vial container is falling straight along the line of the contact plane X as mentioned above it is possible to smoothly guide this vial container to the supply port and to supply it to the next process. In other words, considering that the vial container passes through the empty space which is formed between the contact surface X and the hypothetical surface Z, the vial container is smoothly lowered along the inclination of the inner wall of the vial container passage, and guided to the supply port, after it collides in the portion which is the intersection of the inner wall of the vial container passage and the hypothetical surface Z.

As mentioned above, if the inner wall portion of the vial container passage which intersects the hypothetical surface Z, is made into an inclination which is steeper than the surface which is direct to the hypothetical surface Z, it is possible to guide the vial container in a smooth manner towards the supply port, and it is certainly possible to avoid the trapping of the vial container near the supply port.

BRIEF DESCRIPTION OF THE DRAWINGS

FIG. 4 is a diagram indicating the side view of the inner structure of the medicine filling device in FIG. 1.

DETAILED DESCRIPTION OF INVENTION

Figure 1:
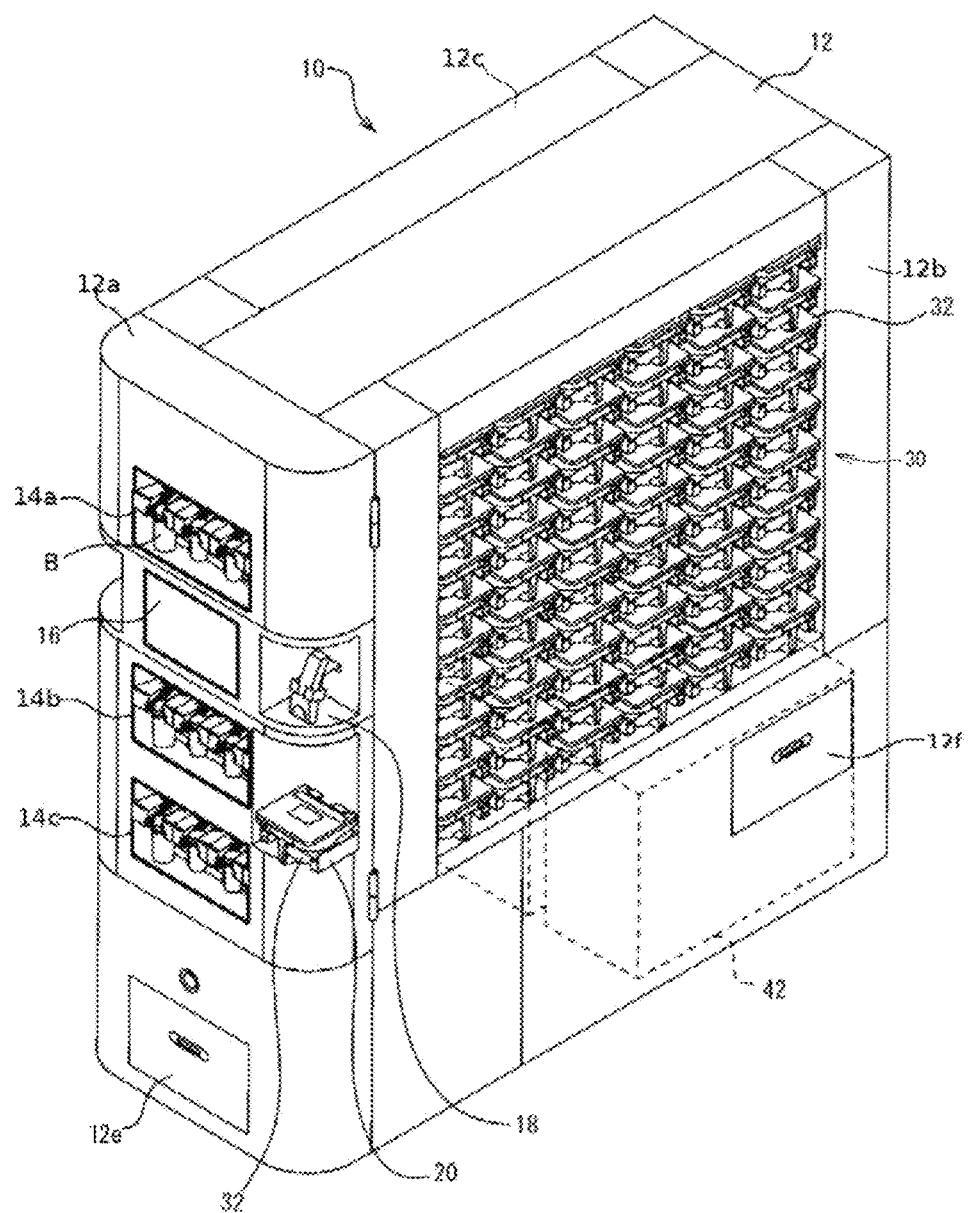
FIG. 1 is a diagram of the external view from a slant angle, of the medicine filling device related to the first embodiment of this invention.
Figure 3:
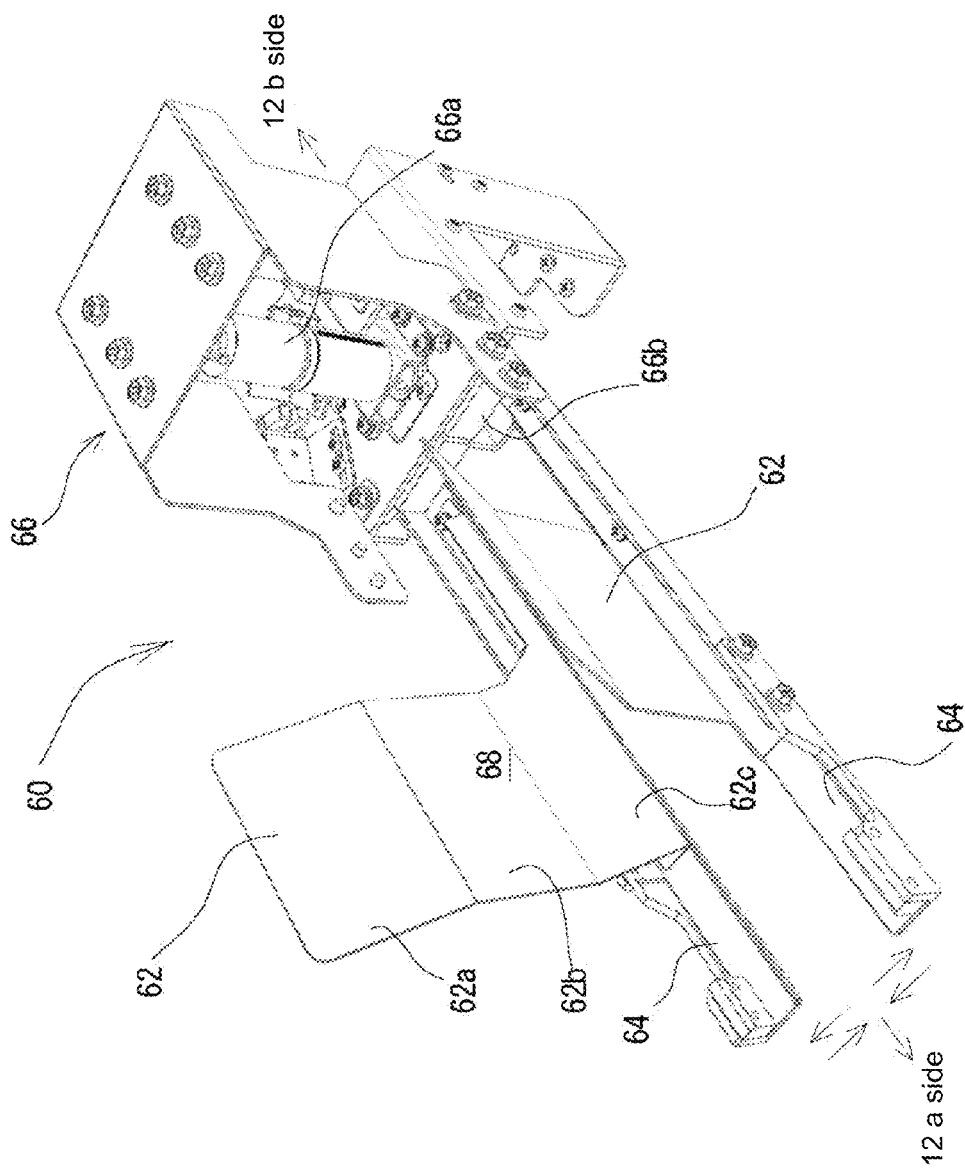
FIG. 3 is a diagram indicating the front view of the medicine filling device in FIG. 1.

Here, we will explain in details, while referring to the diagram, about one embodiment of the medicine filling device 10 of this invention. The medicine filling device 10 is a device which supplies and fills the medicine (Drug) to the vial container B. As indicated in FIG. 1 and FIG. 3, in the frontal surface '12 a' of the device body 12 of the medicine filling device 10, the extraction window '14 a~14 c', which is for extracting the vial container filled with the medicine, or the operating panel 16, bar code reader '18 a', work table '18 b', etc. are designed. Further, in the lower end of the front surface '12 a', the pull out door '12 e' is designed, so that by pulling this, the labeling unit 70 (Please refer to the FIG. 6) which is in the device structure 12, can be pulled out.

As shown in FIG. 1 and the FIG. 2, there are a multiple medicine cassettes 32 attached, which form the medicine supply unit 30, described later, in the device structure 12, and it can be easily put on or taken out from the side surfaces of '12 b, 12 c'. Further, a door '12 f' is designed in the side surface '12 b, 12 c', and by opening this door, it is possible to replenish the vial container B to the vial container supply unit 40 (Please refer to the FIG. 5 and FIG. 6), described later, by opening this.

Figure 5:
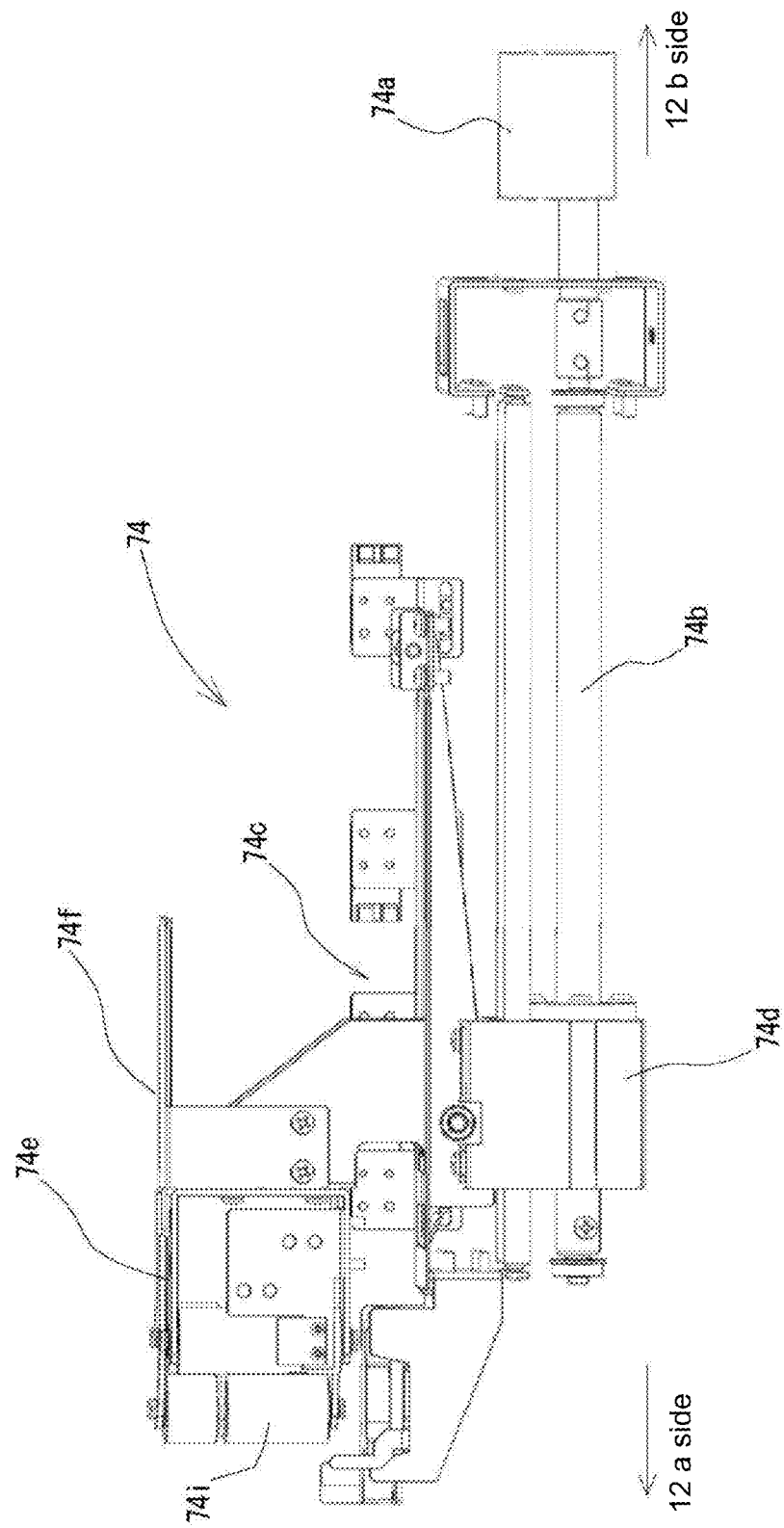
FIG. 5 is a diagram indicating the side view of the inner structure of the medicine filling device in FIG. 1.
Figure 6:
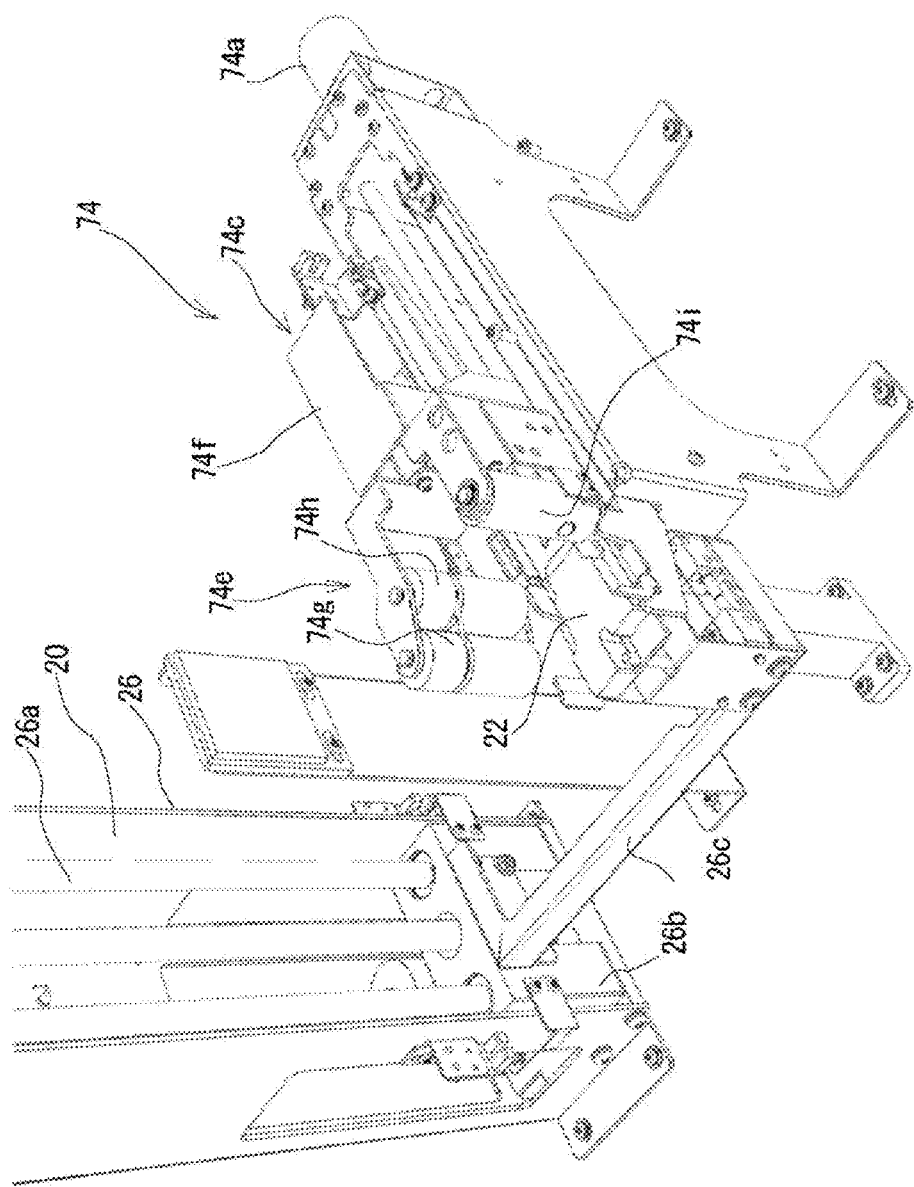
FIG. 6 is a diagram of the external view from a slant angle, indicating the vial container supply unit, labeling unit, and the vial container lifter.

As shown in FIG. 5 and the FIG. 6, the medicine filling device 10, has a vial container lifter 20 on the inner side of the lower side of the device structure 12, as a means to prepare the vial container B, and it also has a vial container supply unit 40 and labeling unit 70, in addition to the medicine supply unit 30, which is for the purpose of filling the medicine in the vial container. Further, in the upper portion of the device structure 12, a transporting unit 80 for the transportation of the vial container B which is prepared in the lower side, and a discharge unit 90 to discharge the vial container which is filled with the medicine by the medicine supply unit 30, to the user, is made. The following is a detailed description about each portion.

Figure 7:
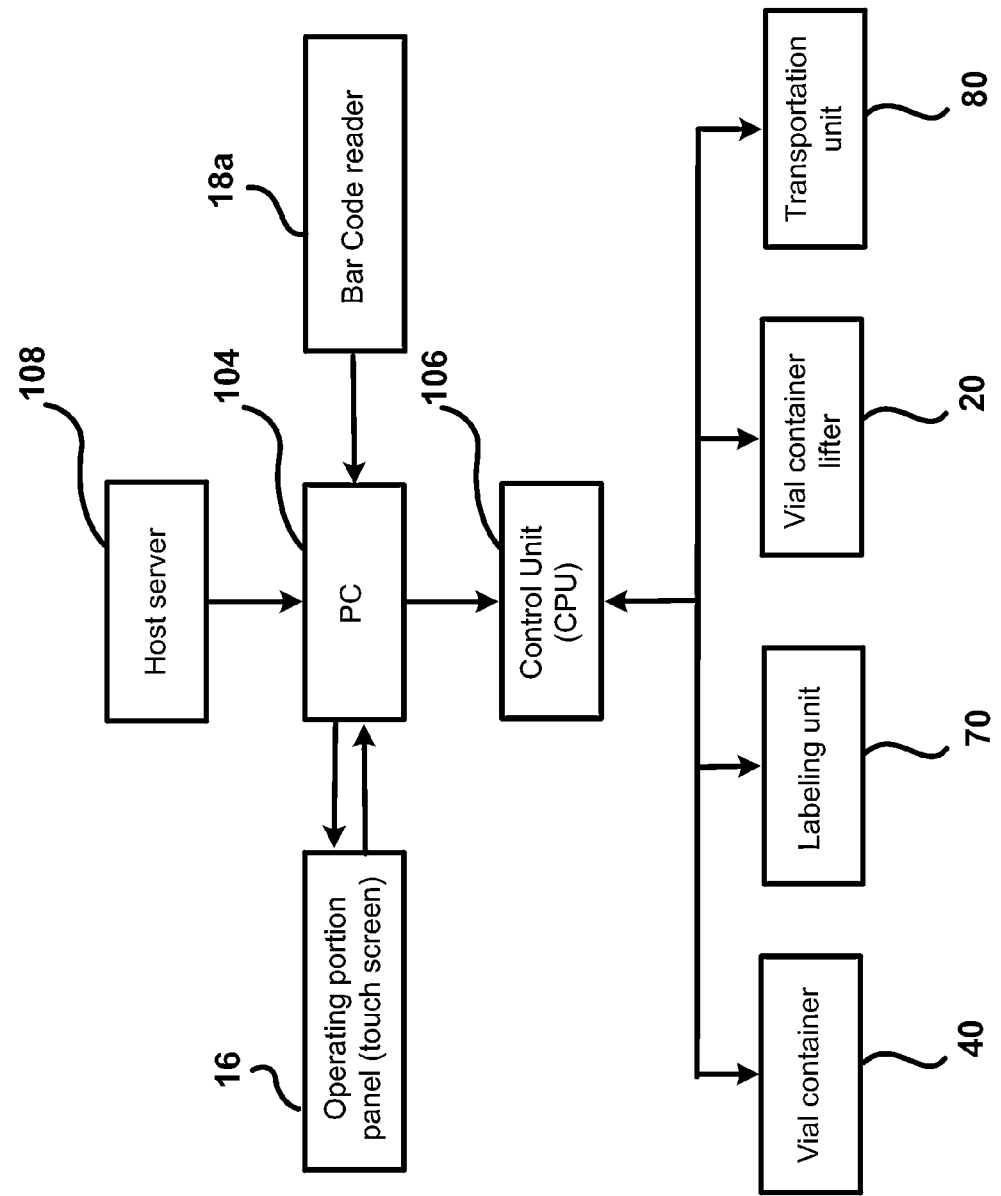
FIG. 7 is a diagram of the external view from a slant angle, indicating the means of transportation.

As shown in FIG. 5 and FIG. 7, the vial container supply unit 40, has a stocker 42, and a draw out mechanism portion 44, and a handover mechanism function 46. The stocker 42 is a box unit of the rectangular form which is formed in order to stock the vial container B. The stocker 42 is on the lower side on both the sides '12 b, 12 c' of the device structure 12 and is positioned in the rear side '12 d'. It is possible to accommodate the vial container B, which is inserted via the door '12 f', randomly, in the stocker 42.

The draw out mechanism 44 is designed in order to draw out the vial container B from the stocker 42 and it is equipped with the conveyor 48, and the draw out mechanism 50 and the transportation means 52. The conveyor 48, is made up of an edgeless belt '48 a'. The conveyor 48, is set up in the bottom of the stocker 42 such that, it is inclined upwards towards the front plane '12 a' of the device structure 12. Therefore, when the conveyor 48 is operated, the vial container B collected in the stocker 42, can be moved towards the left side (front plane '12 a' side) of the page.

The draw out means 50 smoothens or wipes out the vial container B which is collected on the side of the front surface '12 a', with the conveyor 48, inside the stocker 42. The draw out means 50 is a thing which has a pedal '50 b' attached at a constant interval in the edgeless belt 50, which is capable of a drive run, and it is designed such that it is perpendicular to the inner wall of the front side of the stocker 42. For this reason, if we cause the draw out means 50 to operate, then each of the pedal '50 b' sequentially move on to the upward direction, while retaining the horizontal position. Further, with the pedal belt '50 b' which moves in the upward direction, the vial container B which is on the side of the front plane '12 a', of the stocker 42, gets wiped off, and it is drawn out from the stocker 42.

The transportation mechanism 52 is transport means for the vial container B which has been drawn out with the draw out means 50, to the side of the hand over mechanism portion 46. As indicated in FIG. 7, the transportation mechanism 52, has a frame '52 a' and a transportation conveyor '52 b'. The frame '52 a', is attached such that it is aligned along the upper end side of the front surface '12 a' side, of the stocker 42, and the portion on the side of the stocker 42 is released so as to accept the vial container B which has been drawn out with the draw out mechanism 50. Further, in the frame '52 a', a guide '52 c' which acts to prevent the jumping of the vial container B which has been drawn out from the draw out means 50, is attached. Further, in the frame 52 a, colliding side '52 d' is attached in the state of 'retaining for impact'

The transportation conveyor '52 b', is attached to the above mentioned frame '52 a'. The transportation conveyor '52 b', is designed such that the edgeless belt '52 e' which forms the transportation surface, faces the upper end portion of the stocker 42, via the open portion of the frame '52 a'. The conveyor '52 b', causes the edgeless belt '52 e' to move with the help of the operating power source which is not shown in the diagram, due to which it is possible to send the vial container B to the hand over mechanism 46.

Here, the above mentioned colliding side '52 d' is designed in the position on the side of the lower stream side, in the direction of transportation, in the transportation conveyor 52. Further, the colliding side '52 d' is designed at a position which is at a height H higher than the transportation surface of the transportation conveyor '52 b', which is formed with the edgeless belt '52 e'. This height H is higher than the outer diameter of the vial container B, and is lower than the height of the vial container B. Therefore, even if we consider that at the point of time when the vial container is moved from the draw out means 50 to the transportation conveyor '52 b', it is in a standing position, normally the vial container B collides with the colliding side '52 d' in the lower stream path of the transportation conveyor '52 b', and gets into the fallen state, and moves to the hand over mechanism 46. (The case when the vial container B does not fall, is described later).

As shown in FIG. 6, the hand over mechanism 46 is designed almost in the center of the device structure 12. The hand over mechanism 46 is a thing for turning the vial container B which has been transported with the transportation means 52 of the draw out mechanism portion 44, into a standing position, and then handing it over to the next process. The hand over mechanism 46, is equipped with the insertion means 54 and the supply means 60 (Vial container supply means) which is designed in a position which is close to the side '12 a' which is in front of it.

Figure 8:
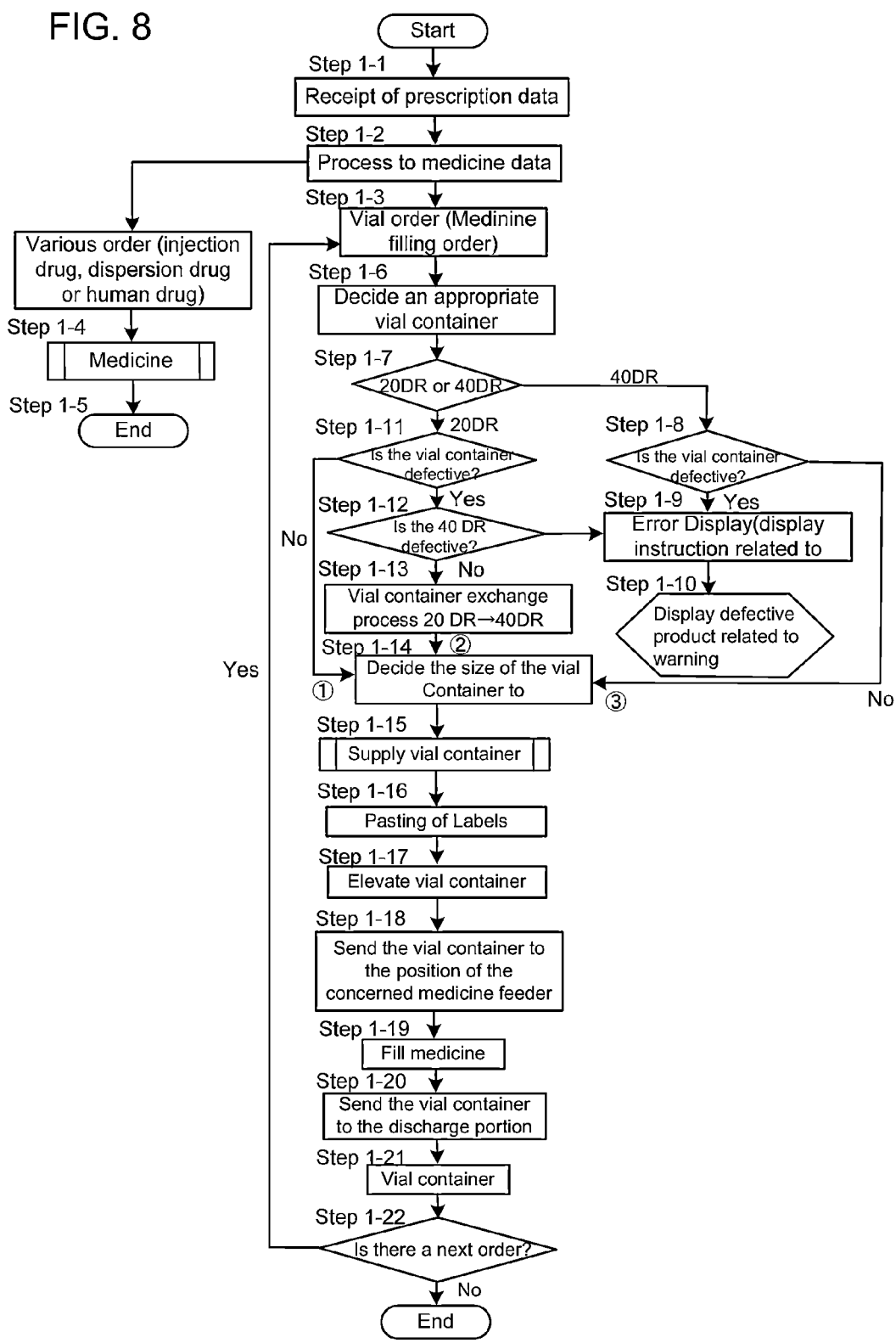
FIG. 8 is a diagram of the external view from a slant angle, indicating the means of insertion, the supply means, the vial container lifter and the pusher.
Figure 9:
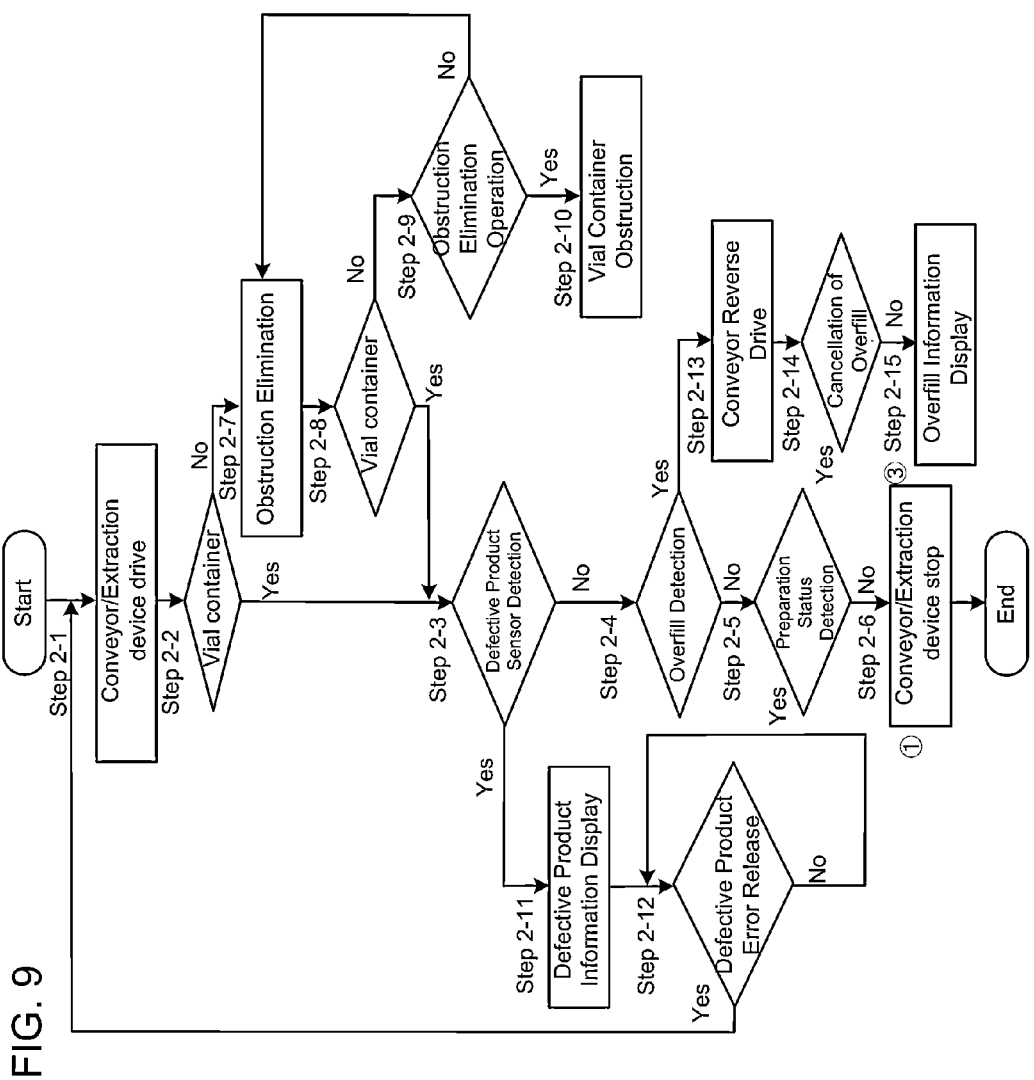
FIG. 9 is a planar diagram indicating the means of insertion, the supply means, the vial container lifter and the pusher.

The insertion means 54 receives the Vial container B which has been sent with the above mentioned transportation means 52, and this vial container B is meant for the purpose of inserting into the supply means 60 on the lower stream side (front surface '12 a' side, left bottom side of the paper in FIG. 6). As indicated in FIG. 8, the insertion means 54 has a pair of guides '54 a' and '54 b' and an insertion side or plate 54 c. The insertion means 54 is designed in the desired position in the down stream edge of the transportation conveyor '52 b'. Further, the guides '54 a', '54 b', are those things which are formed by the bending of the metal plate, and are set up such that they are opposite each other leaving a gap which is greater than the diameter of the vial container B. With this, an empty space '54 d' is formed between the guides '54 a' and '54 b'. For this reason, if the above mentioned transportation means 52 is made to operate, it is possible to cause the vial container B which has been transported due to it, to be received in the empty space '54 d'. Further, the guides '54 a', '54 b' have the portion on their upper edge extending towards the outer side of the empty space '54 d'. Due to this reason, the vial container B which has been transported with the transportation means 52 can enter the empty space '54 d' in a smooth manner.

The insertion side '54 c' is designed between the above mentioned guides '54 a' and '54 b', and are connected via the power transmission mechanism like the link mechanism or something similar, to the power source, which is not shown in the diagram. The insertion side '54 c', can freely rotate with the supporting axis '54 g' as the center, when the starting power source is operated. As shown in FIG. 8 and similar other diagrams, the insertion side '54 c' is formed by bending the metal plate in an almost L shape, and it has a bottom portion '54 e' and a rear plate portion '54 f', the insertion side 54 has the bottom portion '54 e' form the base of the guide '54 a', and the bottom portion '54 b' form the base of the guide '54 d', while the rear plate portion '54 f' is set up such that it obstructs the portion on the side of the rear surface '12 d' of the empty space '54 d'. Further, in the insertion side '54 c', the supporting axis '54 g' is fixed in the rear side of the bottom portion '54 e', and it is positioned such that it leans towards the tip (Front surface '12 a' side). Due to this reason, when the rotation is caused to be done using the supporting axis '54 g' as the center, the bottom portion '54 e' and the rear plate portion '54 f' gets reversed on the side of the front surface '12 a'. Hence, when the insertion side '54 c' is caused to operate in the state when the vial container B is inserted in the space '54 d', the vial container B gets pushed out due to the insertion side '54 c', and is inserted into the supply port 60, while it falls on the front surface side '12 a'.

Figure 10:
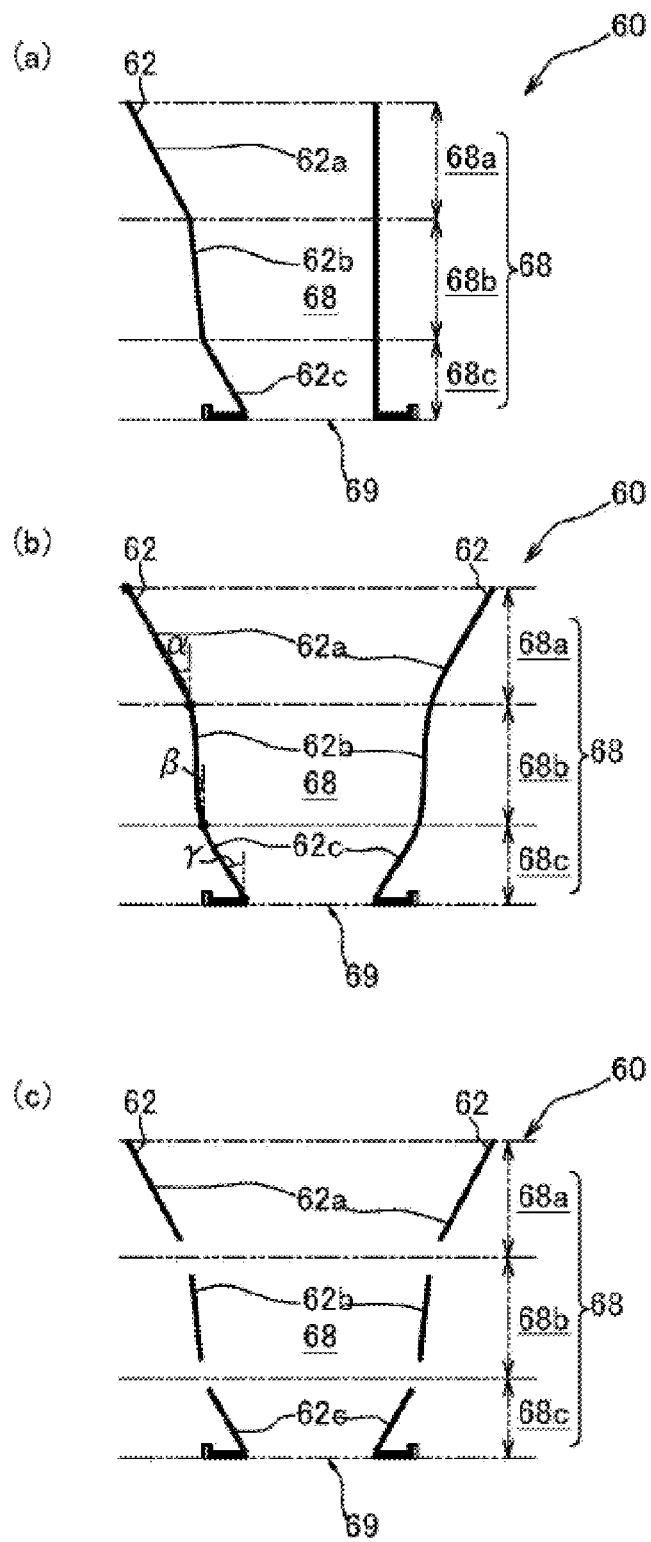
FIG. 10 is a side view diagram indicating the means of insertion, the supply means, the vial container lifter and the pusher.
Figure 11:
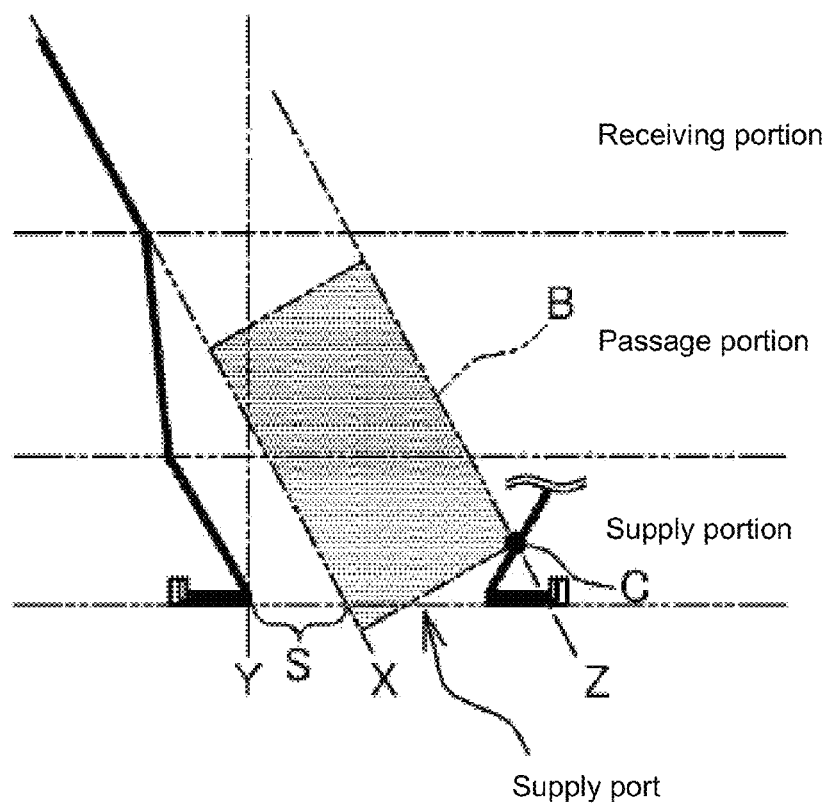
FIG. 11 is a diagram of the external view from a slant angle, indicating the supply means.

The supply means 60 discharges the vial container B which has been received from the insertion means 54 by turning its opening upwards and making it into a standing state, and it is meant to supply it to the next process. As indicated in FIG. 8 and FIG. 11, the supply means 60 is equipped with a pair of container receiving material 62, 62, a pair of arms 64, 64, and an operating mechanism 66. The container receiving material 62, 62 is formed by bending the respective metal plates and processing them, and they are placed opposite each other and are attached to the central portion of the arm 64, 64. The arms 64, 64 are formed from a stick like material, where the respective cross sectional forms are made into an almost L shape. The arms 64, 64 are set up such that they are parallel in the direction from the respective front side '12 a' to the rear side '12 d', extending there from. Further, as shown in FIG. 10 and similar other diagrams, the arms 64, 64 are connected to the driving mechanism 66 via the lower side of the insertion means 54, which is described above.

The drive mechanism portion 66 is designed close to the rear surface '12 d' of the above mentioned insertion means 54. The drive mechanism portion 66 is equipped with the motor '66 a', and the housing '66 b'. The drive mechanism portion 66 starts operation when the power of the motor '66 a', is transmitted to the drive mechanism (not shown in the diagram) which is designed inside the housing '66 b'. Once the drive mechanism inside the housing '66 b' starts operating, it is possible to increase or decrease the gap between the arms 64, 64 and the container receiving portion 62, 62 which is attached to it, as shown with the arrow mark in FIG. 11, while maintaining both of them in a parallel manner.

Figure 12:
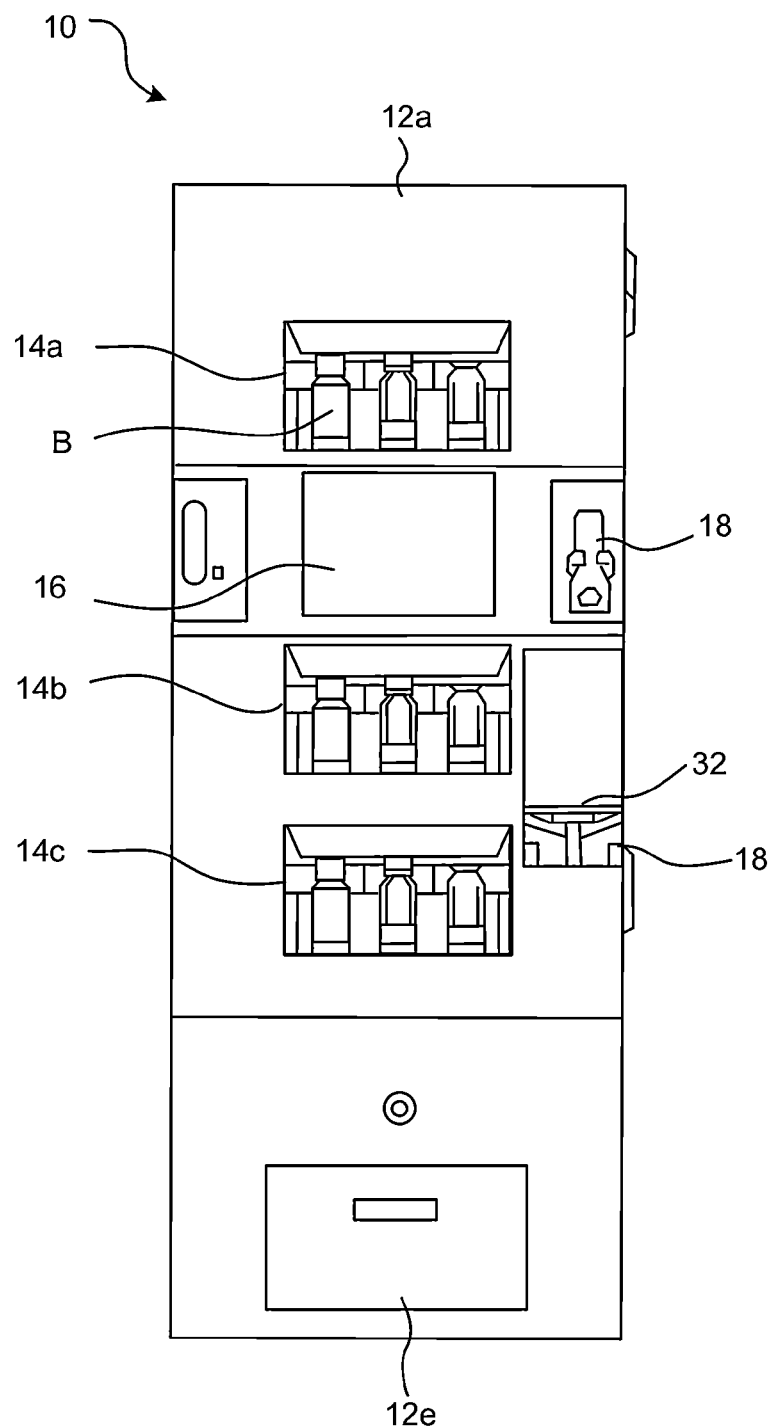
FIG. 12 is a frontal view diagram indicating the positional relationship of the container receiving material in the supply means.

Here, the characteristics of the supply means 60 which are used in the embodiment of this invention are known as being the structure of the vial container passage 68 which is formed between the container receiving material 62, 62 and the structure of the container receiving material 62, 62. Particularly, the vial container B has a size which can pass through the vial container passage 68, and, as shown in FIG. 12, the passage width goes on tapering from the region on the upper end side towards the region on the lower end side. Further, the vial container passage 68 is divided into three regions as '68 a' from the upper side to the receiving region, passage portion '68 b', and the supply portion '68 c'.

The receiving portion '68 a' is the area from the side of the insertion means 54 to the area where the vial container B is received. As indicated in FIG. 12, the surface (called also as the "Inner wall surface '62 a', of the receiving portion") which forms the receiving portion '68 a', in the container receiving material 62, has an angle of inclination of α degrees against the vertical plane, and it is inclined such that the vial container passage 68 forms a tapering form as it goes down side.

Further, the passage portion '68 b', is a continuous portion along the lower side, against the receiving portion, and is a portion where the vial container B passes when inserted in the receiving portion '68 a'. As shown in FIG. 12, the surface which forms the passage portion '68 b' in the container receiving material 62, (Called also as the "inner wall surface '62 b', of the passage portion" below), has the bent portion which forms the boundary with the above mentioned inner wall surface '62 a' of the receiving portion, placed as a boundary in the lower direction, and it has an inclination which is steeper than the inner wall surface '62 a' of the receiving portion. Particularly, the inner wall surface '62 b' of the passage portion, forms an angle of β degree against the vertical surface (α>β), and it is almost close to vertical. For this reason, the ratio of tapering of the passage width of the vial container passage 68, as it goes on decreasing while it moves downwards towards the lower direction, has the passage portion '68 b' which is smaller than the receiving portion '68 a'.

Here, the vial container B has an opening in the upper end portion, and it is cylindrical with the lower end blocked, and its center of gravity is unevenly distributed towards the bottom. For this reason, the vial container B has a nature to have the opening turned upwards even when it is made to fall freely towards the bottom. Further, the vial container passage 68 has the relationship with the inclination of the inner surface wall '62 a' of the receiving portion and the inner surface wall '62 b' of the passage portion, or the tapering ratio D as is described above. Due to this reason, these characteristics work in coordination, and when the center of gravity of the vial container B which passes through along the inner wall surface '62 a', of the receiving portion '68 a', exceeds the boundary of the inner wall surface '62 b' of the passage portion and the inner wall surface '62 a', of the receiving portion, the vial container B is made into a standing state making the opening to face upward.

As shown in FIG. 12, if we assume that the contact surface X which is in contact with the inner wall surface '62 a', of the receiving portion, in the supply means 60, then, in the passage portion '68 b', the inner wall surface '62 b' of the passage portion, is positioned on the outer side of the vial container passage 68 (lower side than the contact surface X), than that of the contact surface X. Further, if we assume the vertical plane Y which passes the edge of the supply port 69 which is designed in the supply portion '68 c', then the inner wall surface '62 b' of the passage portion is positioned on the outer side than the vertical surface Y. Therefore, the space required for changing the state of the vial container B when it enters from the receiving portion '68 a', to the passage portion '68 b', is retained, and the vial container B turns into a straight form without colliding with the container receiving material 62.

Further considering the outer diameter of the body portion of the vial container B as DR, if we assume that the vial container B falls along the contact surface X of the receiving portion '68 a', then As indicated in FIG. 12 (b), the vial container B passes between the contact surface X and the hypothetical surface Z which is separated from the contact surface X by a distance of DR which is the external diameter of the vial container B, and the vial container B collides with the portion (It is also called as the "intersecting portion c") which intersects the inner wall surface '62 c' of the supply portion, and the hypothetical surface Z. As against this, the contact surface X passes through the center of the supply port 69 which is designed in the supply portion '68 c', and an S shaped opening is formed between the contact surface X and the supply port 69. Due to this reason, even if we temporarily assume that the vial container B falls in the position as it is along the inner wall surface '62 a', which is designed in one side of the bottle receiving material 62, and it collides with the intersecting portion C, and there is sufficient space for the vial container B to just spring back without being blocked near the supply port 69, it is possible for it to adjust itself to a standing state. However, even if we assume that the vial container B falls along the contact surface X, in the supply means 60, it is possible to prevent the blocking at the supply port 69 which makes it impossible to supply it to the next process.

The supply portion '68 c', is a portion which exists at a level which is lower than the passage portion '68 b', and the supply port 69 is designed there as is described above. Further, in the container receiving portion 62, the surface which forms the supply portion '62 c', (Called also as the "inner wall surface '62 c' of the supply portion"), is a plane surface which connects the lower end of the inner wall surface '62 b' of the passage portion to the supply port 69, and it functions as the guide to guide the vial container B which has passed the passage portion 68, to the supply port 69. The inner wall surface '62 c' of the supply portion, has a softer inclination than the inner wall surface '62 b' of the passage portion.

Here, if we have a view angle from the point that the vial container B is to be supplied in the straight state, the inclination of the inner wall surface '62 b' of the passage portion can be steeper than the inner wall surface '62 a', of the receiving portion, and in the embodiment of this invention, the inclination of the inner wall surface '62 b', of the passage portion is steeper than the inner wall surface '62 c', of the supply portion. Further, Particularly, in the execution form of this invention, the inner wall surface '62 c', of the supply portion, has an angle of $\gamma$ degrees ($\gamma > \alpha > \beta$) against the vertical surface, and the inclination of the inner wall surface '62 c', of the supply portion, is softer than the inclination of the inner wall surface '62 b', of the passage portion or the inner wall surface '62 a', of the supply portion. For this reason, the taper ratio D of the passage width in the supply portion '68 c', is greater than the taper ratio D in the receiving portion '68 a' or the passage portion '68 b'.

Further, as shown in FIG. 12 (b), the inner wall surface '62 c', of the supply portion has an inclination which is steeper than the surface (called also as the "orthogonal surface F" below), which is orthogonal to the hypothetical surface Z. For this reason, even if the vial container B falls along the contact surface X of the receiving portion '68 a', and it collides with the intersection portion C of the inner wall surface '62 c', of the supply portion, the vial container B is guided smoothly towards the supply port 69, without being caught in the inner wall surface '62 c', of the supply portion, and it is turned to the standing state with the opening upwards.

As mentioned above, when the vial container B reaches the discharge port 69, the vial container B goes into a state where the body portion is let out at a level lower than the discharge port 69. Further, the vial container passage 68 of the supply means 60, is in a state where it is released towards the front surface side '12 a'. Due to this reason, if the vial container B is made to slide from the rear side '12 d' to the front side '12 a', it becomes possible to hand over the vial container B in a standing state with the opening facing upwards, to the next process.

As shown in FIG. 6, the labeling unit 70 is equipped with the label printer 72 and the pusher 74. The label printer 72 is a printer to paste the labels on the outer side of the vial container, and As shown in FIG. 6, it is designed to be positioned near to the front surface '12 a', against the supply means 60.

Figure 13:
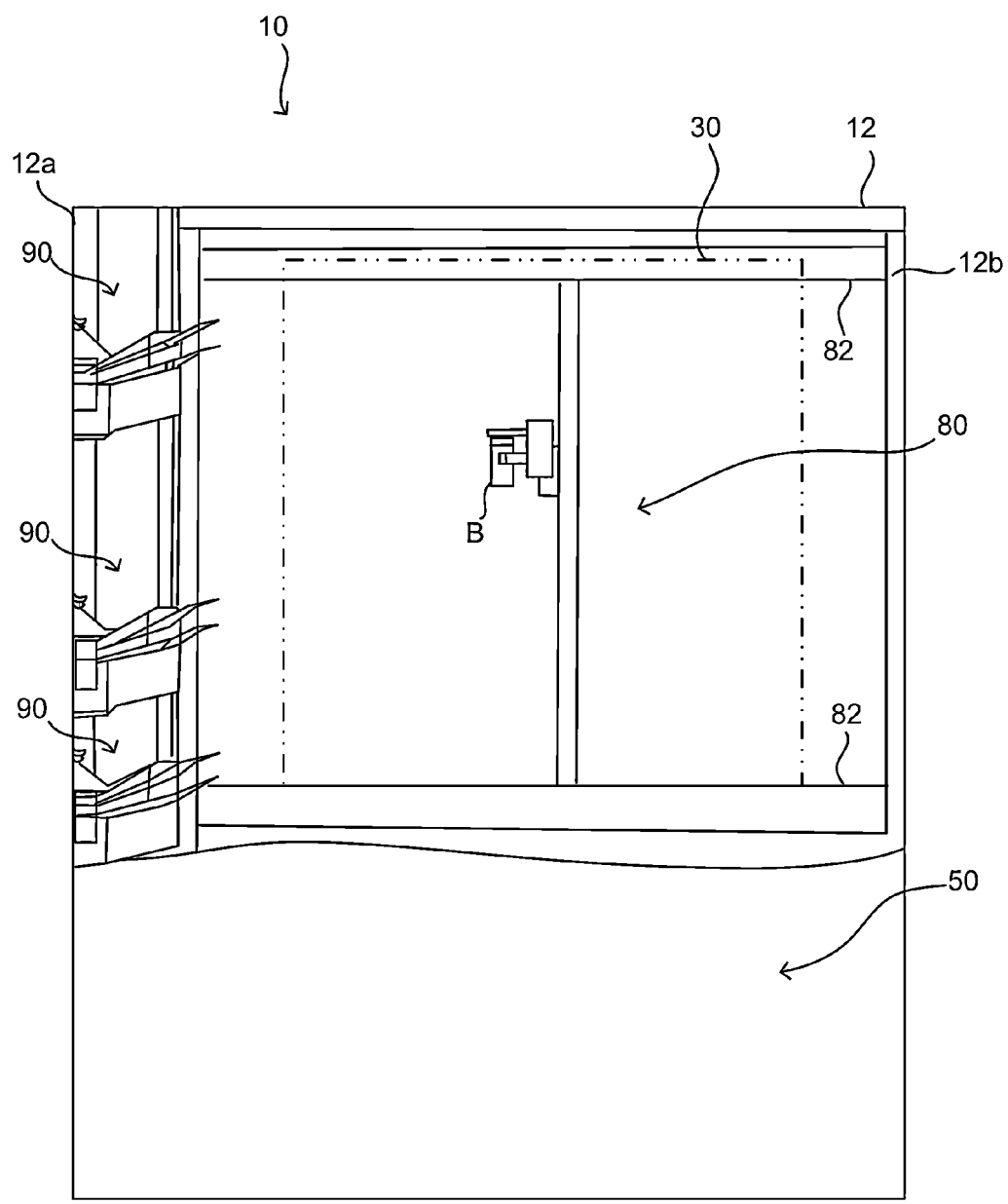
FIG. 13 is a side view diagram indicating the structure of the pusher.

The pusher 74 is a thing which is linked from the rear side '12 d' to the body portion of the vial container B which is waiting after being ejected in a standing state in the lower side, from the discharge port 69 of the supply means 60, and it is meant for pushing the vial container B to the supply means 60 while facing towards the side of the label printer 72. As shown in FIG. 8 or the FIG. 10, the pusher 74 is placed in the lower direction of the above mentioned insertion means 54 or the supply means 60. Further, as shown in FIG. 13 or the FIG. 14, the pusher 74, has a motor '74 a' as the power source, and it has a ball screw '74 b' which is driven by it, and a pusher unit '74 c' which is connected against it. The pusher unit '74 c', is placed on a lower side than the supply port 69 of the supply means 60 which is described above.

As shown in FIG. 13, the pusher unit '74 c', is equipped with the drive unit '74 d' and a pressure compression portion '74 e', and a fall prevention portion '74 f'. The above mentioned ball screw '74 b' is put in the drive unit '74 d', and they are mutually screwed. Due to this reason, the drive unit '74 d' causes the motor '74 a' to operate, due to which the ball screw '74 b' rotates, and it moves in a straight line in the front and rear direction, in other words facing the front side '12 a' and the rear side '12 d'. Further, the pressure compression portion '74 e' and the fall prevention portion '74 f', are fixed on the upper side of the drive unit '74 d'. The pressure compression portion '74 e' seems like the frame having almost the shape of a character "U" when seen from the top, and it has 3 rollers 74 g~74 i which freely exist in it, and it is placed in such a manner that it is in contact with the side surface of the vial container B. When the pressure compression portion '74 e' reaches on the lower side of the supply port 69 of the supply means 60 which is designed in the upper direction, the vial container can be discharged from the position which is close to the front surface '12 a', against the rollers 74 g~74 i.

The fall prevention portion '74 f', is a thing which is meant to prevent the supply of the vial container B from the supply port 69 of the supply means 60 which has been designed in the upper direction, to the pusher 74 which is in the lower side, while the vial container B gets pressed to the labeling unit with the pressure compression portion '74 e'. The fall prevention portion '74 f', is designed in a position which is close to the rear side '12 d' of the pressure compression portion '74 e', and the pressure compression portion '74 e' can block the supply port 69 in the state of movement towards the labeling unit.

Figure 14:
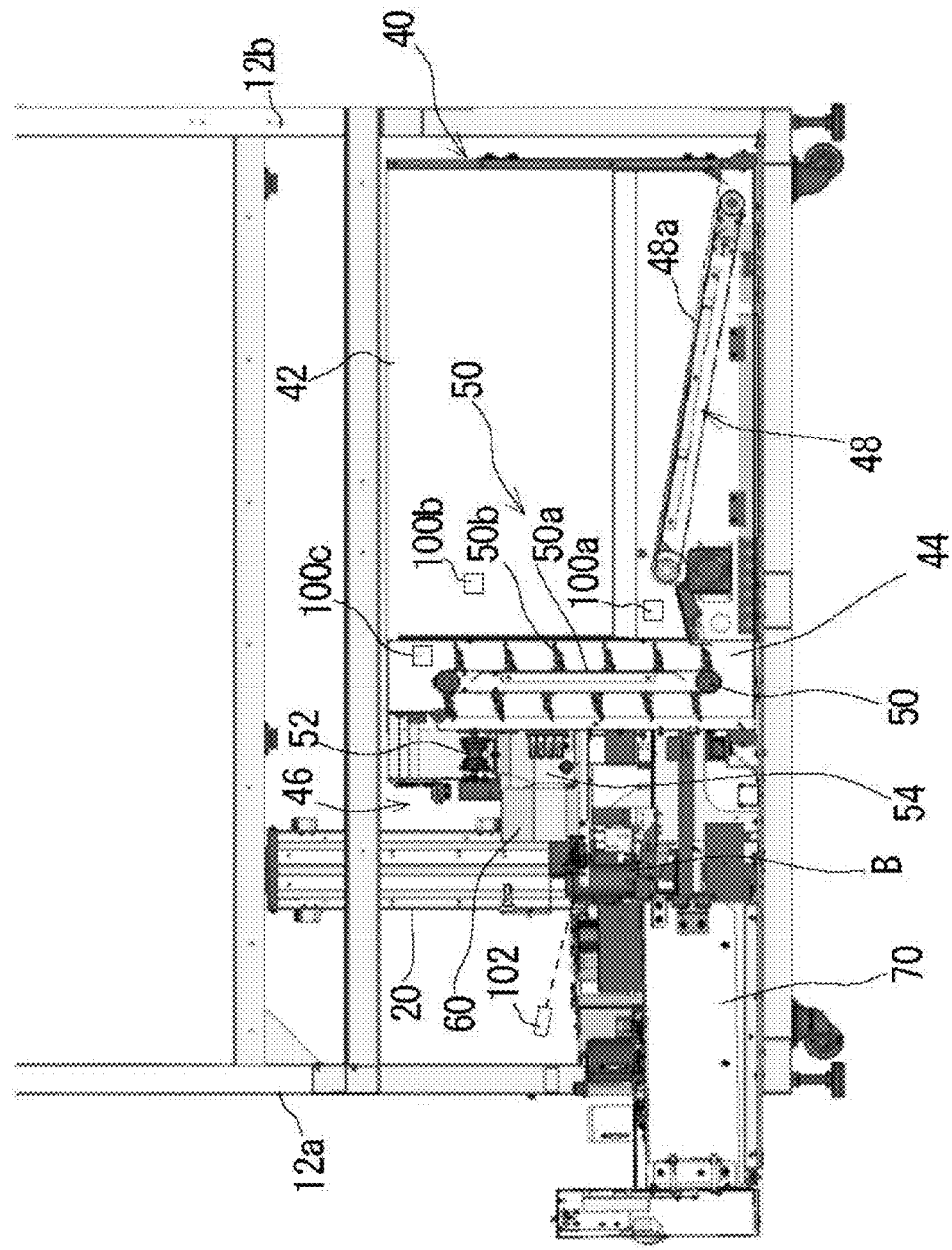
FIG. 14 is a diagram of the external view from a slant angle, indicating the pusher and the vial container lifter.

The vial container lifter 20 is equipped with an elevated table on which the vial container B which has been supplied from the supply means 60 is placed, and it also has an elevating mechanism to elevate this elevated table 22. The elevation mechanism 26 is designed close to the elevating table 22, as shown in FIG. 6 or FIG. 14, and it has a guide rod '26 a' which extends in the upper and lower direction, and an elevated block '26 b' which is installed on it. Further, the elevated table 22 is attached to the elevated block '26 b', via the arm '26 c'. Due to this, once the power is supplied to the elevated block '26 b', with the power source which is not shown in the diagram, the elevated table 22 slides in the up and down direction along the guide rod '26 a', along with the elevated block 26. When the elevated table 22 is moved upwards, the vial container B which is placed on this elevated table 22, can be handed over to the transportation unit 80.

Figure 2:
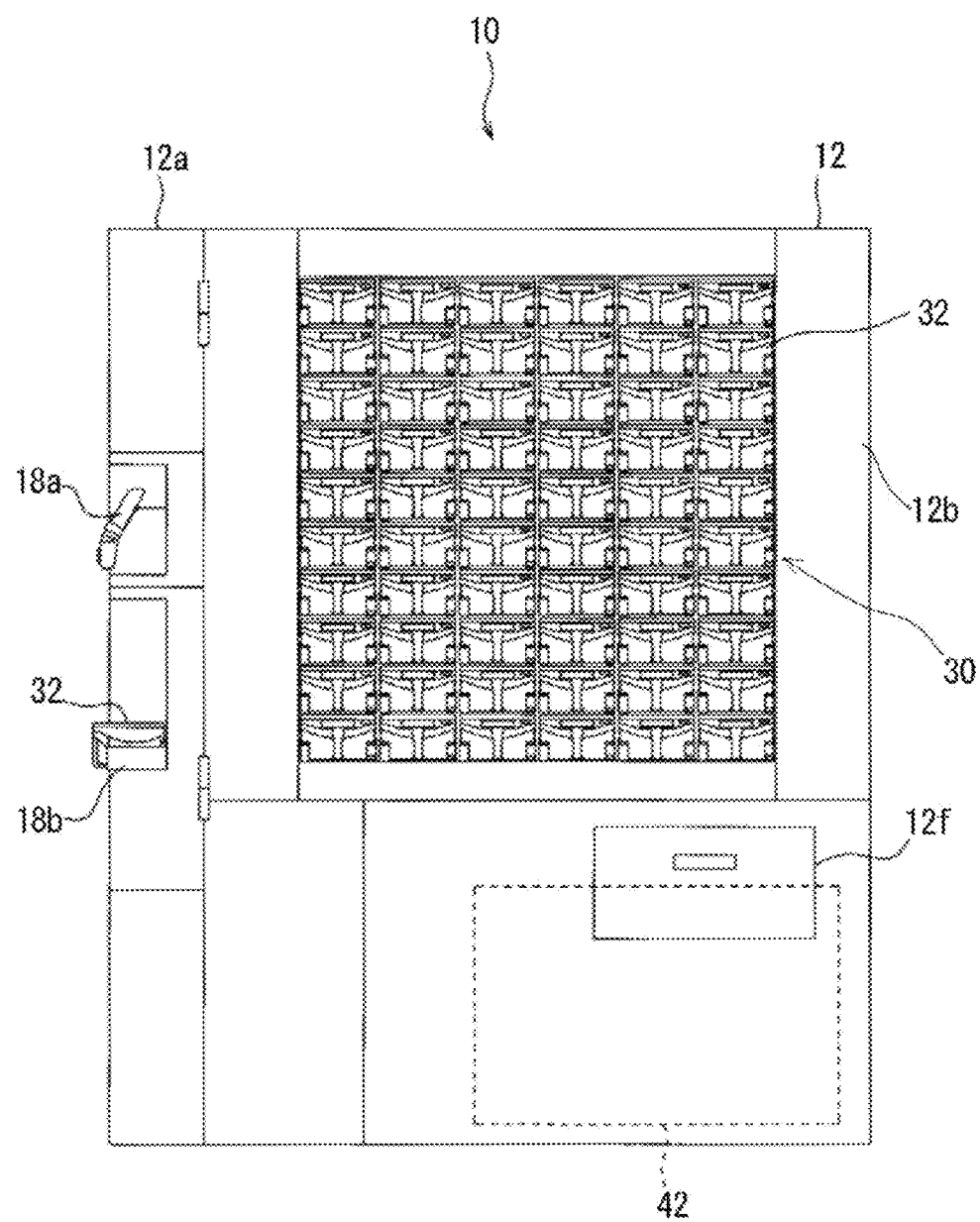
FIG. 2 is a diagram indicating the side view of the medicine filling device in FIG. 1.

As shown in FIG. 1 or FIG. 2, the medicine supplying unit 30, is on both the sides '12 b', '12 c' of the device unit 12, and is designed at a position in the upward direction than the vial container supply unit 40 which is described above. The medicine supply unit 30 has a medicine cassette 32 which can give out the accumulated medicine. The medicine which is given out of the medicine cassette 32, is given out in the gap which is between the medicine supply unit 30, 30 which is designed on both the sides '12 b', '12 c', of the device unit 12.

The transportation unit 80 can move the vial container B which has been received from the above mentioned vial container lifter 20, in a state where the opening is in the upward direction, in the gap which is formed between the medicine supply unit 30, 30, which is designed on both the sides (both sides '12 b', '12 c') of the device unit 12. Therefore, by moving the vial container B up to the position of the give out port (not shown in the diagram) of the medicine cassette 32 in which the medicine to be filled is inserted, with the transportation unit 80, it is possible to fill the medicine in the vial container B.

The transportation unit 80 can move the vial container B in which the medicine has been filled with the medicine supply unit 30, to the discharge unit 90. The vial container B which is transported to the discharge unit 90, can be taken out by the user from the pull out port '14 a'~'14 c'.

The medicine filling device 10, has sensors designed in each place to detect the existence of the vial container in addition to the composition mentioned above. Particularly, as shown in FIG. 5, the medicine filling device 10 has a defective goods detecting sensor '100 a' in the vial container supply unit 40, and it has a overfill sensor '100 b' which is designed in the upper direction of that. Further, in addition to this, when the pedal '50 b' which is designed in order to wipe the vial container, moves to the top most position, there is a preparation state detection sensor '100 c' which is designed in the vial container supply unit 40, to detect the presence or absence of the vial container B which is supported with this pedal 50. Moreover, as shown in FIG. 7, there is a transfer detection sensor 101 designed in the transfer means 52. The transfer detection sensor 101 is designed in the transfer means 52, in the lower side of the direction of transportation of the vial container B, in other words, it is designed near the collision side or plate '52 d'.

Moreover, in the upper direction of the labeling unit 70, the vial container expectation sensor 102 is designed. The vial container expectation sensor 102, is made up of the infra red sensor, and its light axis is directed towards and near the supply port 69 which is designed in the supply means 60. Due to this, it is possible to detect whether the vial container B is ready in the supply port 69 or not.

Figure 15:
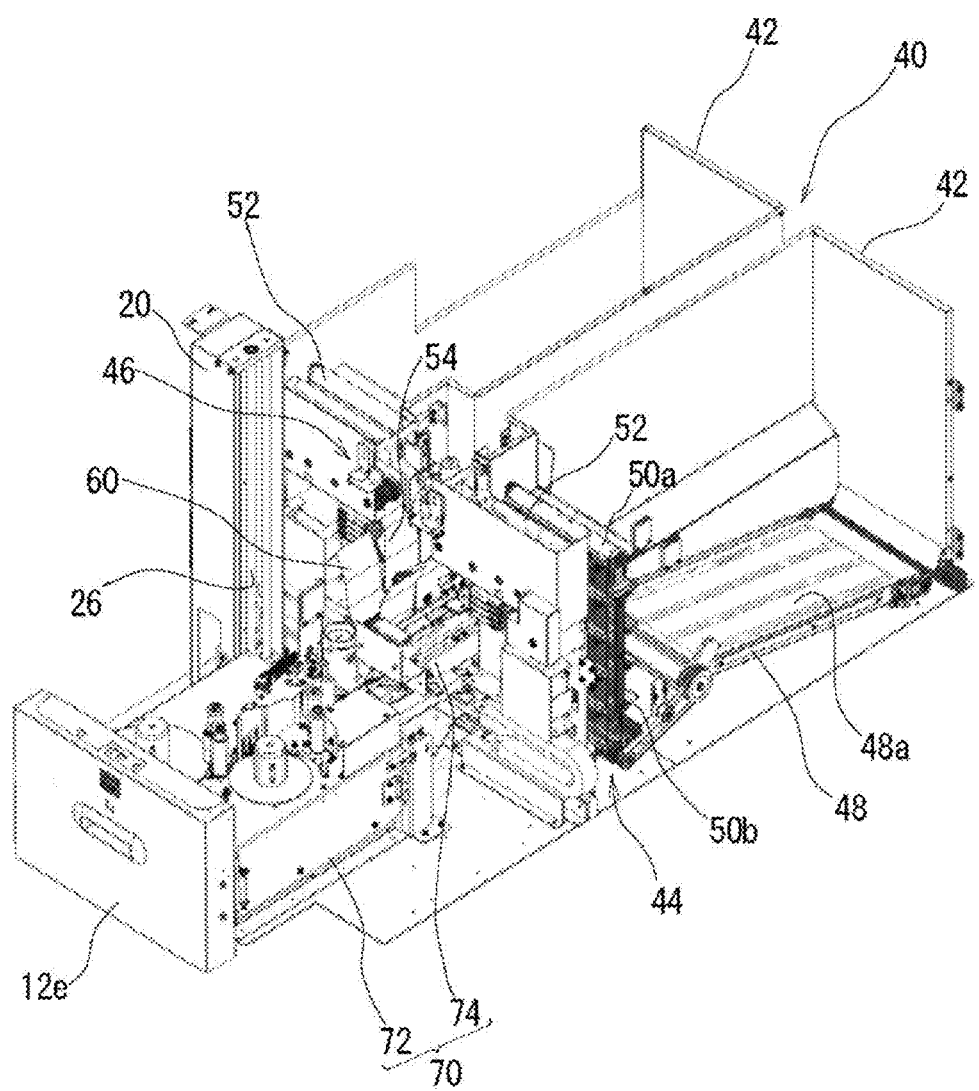
FIG. 15 is a block diagram of the medicine filling device.

The FIG. 15 is a controlled block diagram of the medicine filling device 10. The above mentioned vial container supply unit 40 and the labeling unit 70, vial container lifter 20, transportation unit 80, is controlled by the control unit 106, based on the instructions from the personal computer 104. Further, the personal computer 104 is managed with the host server 108. The personal computer 104 can have the data entered in it by using the touch screen of the operation panel 16, and it is also possible to have the required data output via the touch screen of the operation panel 16. Further the personal computer 104 is also made such that read signal from the bar code reader '18 a' is also entered in it.

Figure 16:
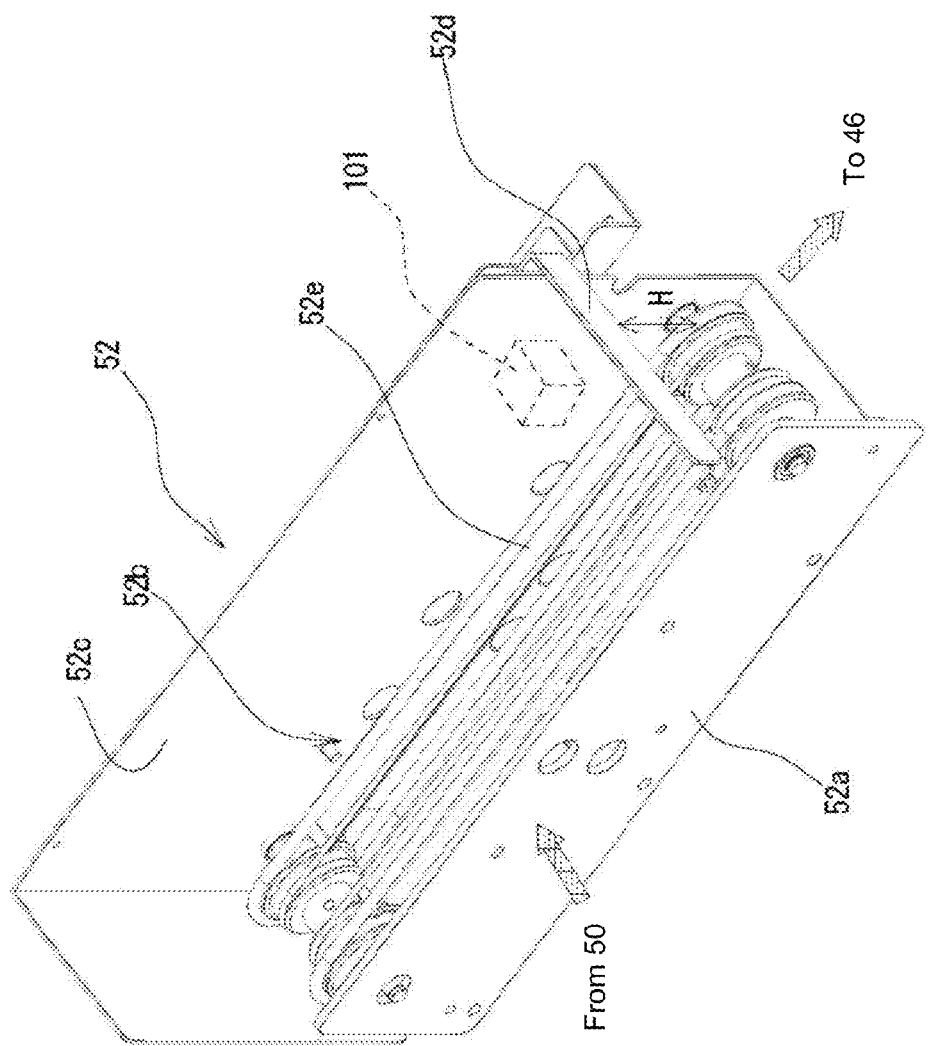
FIG. 16 is a flow chart indicating the operation of the medicine filling device.

Regarding the operation of the medicine filling device 10, the explanation is provided with the flow chart in FIG. 16. The prescription data is entered in the personal computer 104, from the host server 108 in the step 1-1, and in the step 1-2, the prescription data from the personal computer 104 is processed to the pharmaceutical data. In case the pharmaceutical data is the data of an injection drug, dispersion drug or human drug, the control flow moves to the step 1-4, and in order to process them, the 'give out' order is given for the device (not shown in the diagram) which is separately designed. After that, in the step 1-5, the regulation of the drug is performed in each device.

On one side, if the pharmaceutical data which is processed in the step 1-2, is the one which formulates the drug, then the control flow moves to the step 1-3, and an order (medicine filling order) is given to 'give out' the medicine from the medicine filling device 10. Once the medicine filling order is given, the control flow moves to the step 1-6, and the vial container B having the appropriate size of the volume to fill the medicine, is decided.

Here, as described above, in the medicine filling device 10 of this invention, there are 2 stockers 42 designed in the vial container supply unit 40, and the extraction mechanism 50 which are respectively designed, and the transportation means 52 can be used to extract the vial container B. For this reason, by keeping the vial containers B having different volumes are kept ready in each of the stocker 42, it is possible to get a vial container B ready which has an appropriate size corresponding to the volume of the medicine to be filled. Here, when the size of the vial container B is decided in the step 1-6, the control flow moves to the step 1-7, and the size of the vial container B which is to be prepared for filling the medicine is determined. Once the fact that a big vial container B (40 DR) is ready, is determined in the step 1-7, the control flow moves to the step 1-8, and the vial container B can be taken out by means of the transportation means 52 or the extraction means 50 which are designed in the stocker 42, in the direction where the big vial container B is collected.

Particularly, if the size of the vial container B which is decided in the step 1-7, is of a large size (40 DR), then, based on the detection signal of the defective goods sensor '100 a', which is designed in the stocker 42, in which the large size vial container B is collected in the step 1-8, the check is done to find out if the large size vial container is a defective product or not. In case the large size vial container is a defective product, an instruction is displayed in the step 1-9 and step 1-10 that the vial container has to be replaced, and this is done via the operating panel 16.

On the other hand, if the vial container B which is selected in the step 1-7, is of a small size, then, in the step 1-11, it is checked with the help of the detection signal from the defective goods sensor '100 a' which is designed in the stocker 42, whether the vial container B of the small size, is a defective product or not. Here, if the small size vial container is a defective product, then in the step 1-12, it is determined whether the large size vial container B is a defective product or not. Here, if the large size vial container B is also a defective product, then the control flow moves to the step 1-9, and the error is displayed via the operating panel 16. On the other hand, in the step 1-12, if it is confirmed that there is a large size vial container B, then the control flow moves to the step 1-13, and it is decided that the large size vial container B can be used as a substitute of the small size vial container B.

Figure 17:
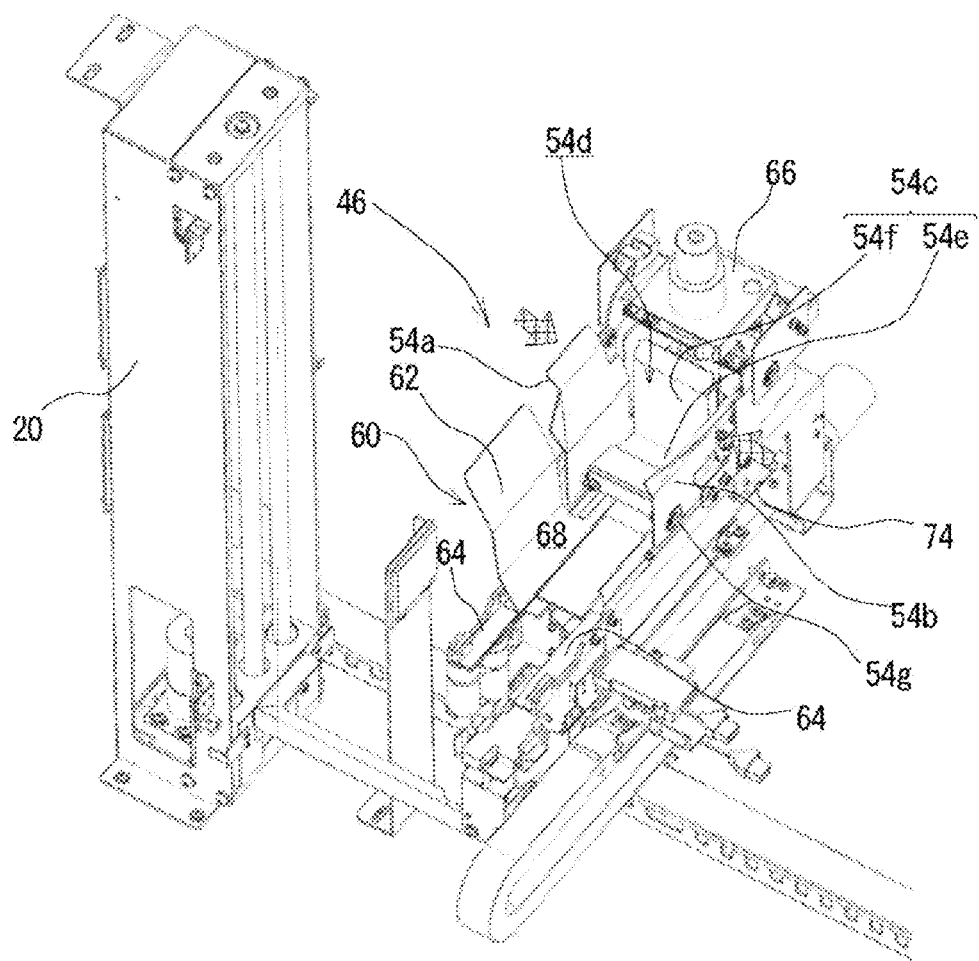
FIG. 17 is a flow chart indicating the operations of the vial container supply unit of the medicine filling device.

Once the warehouse state of the vial container B is confirmed from the above mentioned flow, the control flow moves to the step 1-14, and the size of the vial container B which is supplied for the medicine filling is decided. Particularly, if it is determined that there is a large size vial container B in the warehouse, in the above mentioned step 1-8, or in case it is decided in the step 1-13, that the large size vial container B is used as a substitute product for the small size vial container B, then the size of the vial container B to be supplied will be decided to be large. If on the other hand, in the step 1-17, a small size vial container B is selected, and if there is a stock of the small size vial containers B, then the size of the vial containers to be supplied will be decided to be small. By deciding the size of the vial containers in such a manner, the control flow moves to the step 1-15, and the vial container B is supplied following the sub routine as shown in FIG. 17.

More particularly, when the control flow moves to the step 1-15, first of all, the operation of the extraction means 50 and the conveyor 48 which is designed in the stocker 42, in which the vial container B whose size has been determined as mentioned above is collected, is started in the step 2-1. With this, the vial container B which is collected in the stocker 42, is wiped with the help of the pedal '50 *b*' of the extraction means 50, and it is moved on to the transportation conveyor '52 *b*' of the transportation means 52, which is designed in a position close to the upper edge portion of the stocker 42. After that, the vial container B is transported towards the insertion means 54, with the help of the transportation conveyor '52 *b*'. At this time, the vial container B passes the lower direction of the colliding side '52 *d*', which is installed in the frame '52 *a*' of the transportation means 52. For this reason, even if we temporarily assume that the vial container B flows on the transportation conveyor '52 *b*', in a standing state, it will collide with the colliding side '52 *d*', and fall, and will be sent to the insertion means 54.

The vial container B which is transported towards the insertion means 54, by doing as mentioned above, gets inserted in the space '54 *d*' which is formed between the guide '54 *a*', '54 *b*'. Once the insertion of the vial container B in the empty space '54 *d*' is complete, the insertion side '54 *c*' will rotate using the supporting axis '54 *g*' as the center. By doing this, the vial container B gets inserted from the side of the receiving portion '68 *a*', inside the vial container passage 68, of the supply means 60, which is designed on the side of the front surface '12 *a*' and it is supplied in a standing state from the supply port 69 of the supply portion '68 *c*', which is designed on the lower edge side.

If we explain in further details about the flow of the vial container B in the supply means 60, then the vial container B gets inserted in the receiving portion '68 *a*', of the vial container passage 68, which is formed between the pair of the container receiving material 62, 62, with the help of the insertion means 54. The vial container B falls towards the lower direction along the inner wall surface '62 *a*' of the receiving portion, which forms the receiving portion '68 *a*'. Here, as mentioned above, the vial container passage 68 has the taper ratio D of the passage width in the receiving portion '68 *a*' to be greater than the taper ratio D in the passage portion 68. In other words, the inner wall surface of the vial container passage 68 has a wide change in the inclination using the boundary between the receiving portion '68 *a*', and the passage portion '68 *b*' which is placed in the lower direction of the same, as the border. In further detailed terms, the inner wall surface '62 *b*' in the passage portion, which forms the passage portion '68 *b*', is almost vertical, and the angle β by which the inner wall surface '62 *b*' of the passage portion is almost vertical, is smaller than the angle α by which the inner wall surface '62 a' in the passage portion forms the receiving portion '68 *a*'. For this reason, when the center of gravity of the vial container B exceeds the boundary of the receiving portion '68 *a*' and the passage portion '68 *b*', the vial container B changes its posture to become a straight state, and falls towards the supply portion '68 *c*' which is designed in the lower direction. After that, the vial container B is guided to the inner wall surface '62 *c*' of the supply portion which forms the supply portion '68 *c*', and reaches the supply port 69. When the vial container B reaches the supply port 69 in such a manner, the vial container B is detected with the help of the vial container expectation sensor 102. (Step 2-2).

On one hand, when the above mentioned operations are performed in a series, then regardless of the fact that the vial container B is detected with the transportation detection sensor 101, which is designed in the transportation means 52, if the vial container B is not detected in the step 2-2, then the vial container B which is taken out from the stocker 42, may not reach the insertion means 54 or the supply means 60 due to being obstructed between the transportation surface of the transportation conveyor '52 *b*' and the collision plate '52 *d*' in the transportation means 52. Here, if in the step 2-2 the vial container B is not detected, then the control flow proceeds to the step 2-7, and the operation to eliminate the obstruction of the vial container B in the transportation conveyor 52, is eliminated (Obstruction elimination operation). Particularly, in the step 2-7, the transportation conveyor '52 *b*' operates such that the transportation surface moves the vial container B in the direction of transportation and the reverse direction. In case the vial container B is caught up between the collision side '52 *d*' and the transportation surface of the transportation conveyor '52 *b*', and by causing the transportation conveyor '52 *b*' to operate in the reverse direction, by doing as above, the vial container B returns to the upstream side of the transportation conveyor '52 *b*', and the obstruction of the vial container B is eliminated. After that if the transportation conveyor '52 *b*' is caused to operate in the orderly direction, the vial container B is supplied while facing the insertion means 54.

In case the vial container B is inserted in the insertion means 54, while the obstruction elimination operation is being performed in the step 2-7, then the vial container B reaches the supply port 69, via the insertion means 54 and the supply means 60, as mentioned above and this is detected with the vial container expectation sensor 102 (Step 2-8). On the other hand, if the vial container B does not get detected (step 2-9) with the vial container expectation sensor 102, even when the obstruction elimination operation is performed for a specified number of times, as indicated in the step 2-7, then the vial container B gets obstructed in a location other than the transportation conveyor '52 *b*', due to which there is a high possibility that it may lead to a defective vial container B related supply. Here, in such a case, the control flow moves to the step 2-10, and a warning (vial container obstruction error) notifying that there is a vial container B defective supply, is displayed in the operation panel 16.

Once it is confirmed as mentioned above that the vial container B has reached the supply port 69, then the control flow moves to the step 2-3, and the defective goods sensor '100 *a*' performs a detection again of whether the vial container B has detected the defective goods or not, during the supply operation of the vial container B. Here, if the defective goods have been confirmed, then the control flow moves to the step 2-11, and the defective goods warning is displayed on the operating panel 16. On the other hand, in the step 2-3, if the vial container B is not a defective product, then the control flow moves to the step 2-4, and it is confirmed whether the vial container has been inserted in excess (over fill status) in the stocker 42. Whether the stocker 42 is in the over fill status or not, is decided based on the detection signal of the overfill sensor '100 *b*' which is designed in the stocker 42. Here, if the stocker 42 is in an overfill state, then the control flow proceeds to the step 2-13, and only the conveyor 48 is reversed in order to reduce the bulk of the vial container B which is near the pedal '50 *b*'. Even if the conveyor 48 is made to move in a reverse direction, if there is a detection that it is in the overfill state, in the step 2-14, then more than 2 vial container B are supplied, and there is a fear that an excess load, more than that required, will be applied to the pedal '50 *b*', and it may get damaged. There, in this case, the control flow moves to the step 2-15, and the warning indicating that it is in the overfill state is displayed with the operating panel 16.

After the warning is displayed in the step 2-15, the excess vial containers B are eliminated, and if there is no more a detection that it is an overfill state, then the warning error is released in the step 109, and the control flow returns to the step 2-1. In the step 2-14, if there is no more any detection of the overfill state, due to the reversal of the conveyor 48, the control flow moves to the step 2-5, and it is checked with the preparatory state detection sensor '100 *c*' whether the vial container B exists in the paddle '50 *b*' which is in the top most position, and whether it is in the preparatory state or not. Here, if the fact that the vial container B is ready in the paddle '50 *b*', is confirmed, then the control flow proceeds to the step 2-6, and the drive of the conveyor 48 and the extraction means 50 is stopped and the sub routine indicated in FIG. 17 is completed.

As mentioned above, if the vial container supply operation is terminated following the sub routine indicated in FIG. 17, then the control flow will return to the step 1-16 of the flow chart in FIG. 16, and the operation of pasting the labels on the vial containers is performed. Particularly, in the step 1-16, the pusher 74 is driven, and the vial container B which is supplied from the supply port 69 of the supply means 60 is moved on to the supporting plate 24, of the vial container lifter 20. By doing this, the vial container B is pressed against the drive roller 38 of the label printer 72, and it rotates. In this state, the label printer 72 operates, and the label gets pasted on the outer peripheral surface of the vial container B.

Once the label pasting operation is complete, the control flow proceeds to the step 1-17, and the transportation unit 80 starts operating, and the vial container is moved to the place where the medicine cassette 32, in which the medicine to be filled is collected, is present. After that, the control flow proceeds to the step 1-18, and the medicine is filled in the vial container B from the medicine cassette 32.

Once the filling of the medicine is complete as described above, the control flow proceeds to the step 1-20, and the transportation unit 80 starts operating, and the vial container B, which is filled with the medicine, is moved towards the discharge unit 90. Once the vial container B is delivered to the discharge unit 90, it will get in to a state where it can be discharged from the discharge window 14, which is designed in the front surface 12 *a*, of the device structure 12. After that, the control flow moves on to the step 1-22, and subsequently it is checked whether there was an order to fill the medicine in the vial container or not. Here, in case when it is confirmed that the following order is present, then the control flow proceeds to the step 1-3, and in case there is no order, then the consecutive control flow is ended.

As described above, in the medicine filling device of this invention, the width of the passage, of the vial container passage 68 which is formed in the inner portion of the supply means 60, is formed such that it gradually tapers from the region in the upper direction to the region in the lower direction. Further, the taper ratio D of the passage portion '68 *b*', is smaller than the taper ratio D of the passage width in the receiving portion '68 *a*', and the inclination of the inner wall surface '62 *b*', of the passage portion, which forms the passage portion '68 *b*', is steeper than the inclination of the inner wall surface '62 *a*', of the receiving portion, which forms the receiving portion '68 *a*'. In further details, in the boundary portion of the receiving portion '68 *a*' and the passage portion '68 *b*', the inner wall surface of the supply means 60 is indented, and the inclination between the upper and edge the lower edge of the passage portion '68 *b*', is closer to vertical than that compared to the tapering between the upper and lower edge of the receiving portion '68 *a*'. Due to this reason, in the medicine filling device of the invention, when the center of gravity of the vial container B which is inserted in the supply means 60 exceeds the boundary of the receiving portion '68 *a*' and the passage portion '68 *b*', the state of the vial container B changes to that of the standing state, depending on the change in the inclination of the receiving portion '68 *a*' and the passage portion '68 *b*'.

Further, in the medicine filling device 10 of this invention, since the width of the passage of the vial container passage 68 in the passage portion '68 *b*', is greater than that of the supply port 69, which is designed for the supply of the vial container B, sufficient space is ensured for the vial container to change its posture. Due to this reason, in the medicine filling device 10 of this invention, the vial container B can smoothly change its posture without colliding with the wall surface which composes the vial container passage 68, in the supply means 60, and there is no occurrence of a defective operation due to the blocking of the vial container B in the supply means 60.

In the above mentioned embodiment, the inner wall surface '62 *b*' of the passage portion which forms the passage portion '68 *b*', indicated an example where it was almost vertical, but this invention is not limited to these only, and it is alright even if it is not vertical if the inclination of the internal wall surface '62 *a*' of the receiving portion is a bit more steeper.

As mentioned above, the supply means 60 is the metal plate indented and processed, and used as the container receiving material 62, in the boundary portion of the receiving portion '68 *a*' and the passage portion '68 *b*', or in the boundary portion of the passage portion '68 *b*' and the supply portion '68 *c*', and the device structure is kept simple. Therefore, the medicine filling device 10, does not require a lot of space for the installation of the supply means 60.

Further, the medicine filling device 10 of this invention, has the passage width gradually tapering, as is described above, due to the inner wall surface '62 *c*', of the supply portion, which is designed in the supply portion '68 *c*', from the side of the passage portion '68 *b*' towards the supply port 69. Therefore, the vial container B turns into a straight state while passing through the passage portion '68 *b*', and it is guided smoothly to the supply port 69, and can be supplied to the subsequent process.

In the above mentioned embodiment, both of the pair of the container receiving material 62, 62, which forms the vial container passage 68, have the inner wall surface '62 *a*', of the receiving portion, or the inner wall surface '62 b', of the passage portion, inner wall surface '62 c', of the supply portion, formed. Therefore, even if we assume that the vial container B is inserted from either side of the bottle receiving material 62, 62, it is possible to smoothly turn the vial container B into a standing state and supply it.

In the above mentioned embodiment, there are 2 stockers 42, 42 which are designed on both the left side and the right side of the supply means 60, and in order to ensure that it can deal with a situation where the vial container B can be given out from any of the stockers 42, 42, the example was given of the case where the container receiving material 62, 62, which is similarly indented and molded, but this invention should not have restrictions. Particularly, if the passage width of the vial container passage 68, is caused to taper towards the lower direction, then, it is alright if one of the inner wall surfaces which are placed opposite to each other are indented, and the other is kept plane or something similar, and as long as it can make a structure which will prevent the flying of the vial container B in the vial container passage 68, it is alright. Further, if in the above mentioned embodiment, if the structure is made such that out of the stockers 42, 42 from the medicine filling device of this invention, one of them is omitted, then As indicated in FIG. 18, out of the container receiving material 62, 62 which is placed opposite each other, the things which are on the side where the stocker 42 is omitted, can be substituted with a plane metal plate or something similar.

The vial container passage which is formed in the supply means 60, as mentioned above is formed between the pair of container receiving material 62, 62 which are facing opposite to each other, and it is released for the surface which intersects these container receiving material 62, 62, but this invention should not have restrictions, and its 4 directions are surrounded by a wall.

Figure 18:
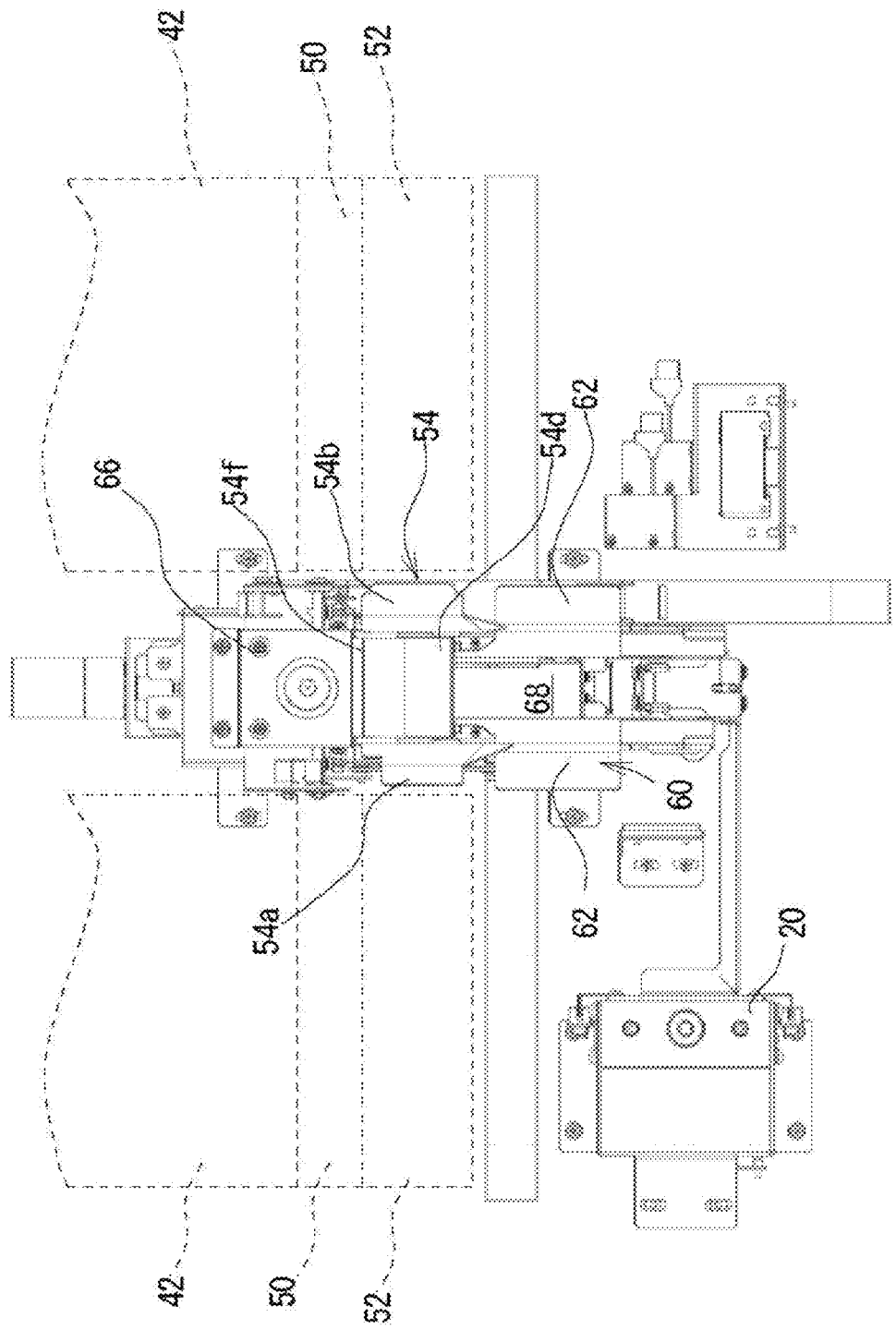
FIGS. 18 is the frontal view diagram, which indicate the example of transformation of the container receiving material which forms the respective supply means.
Figure 19:
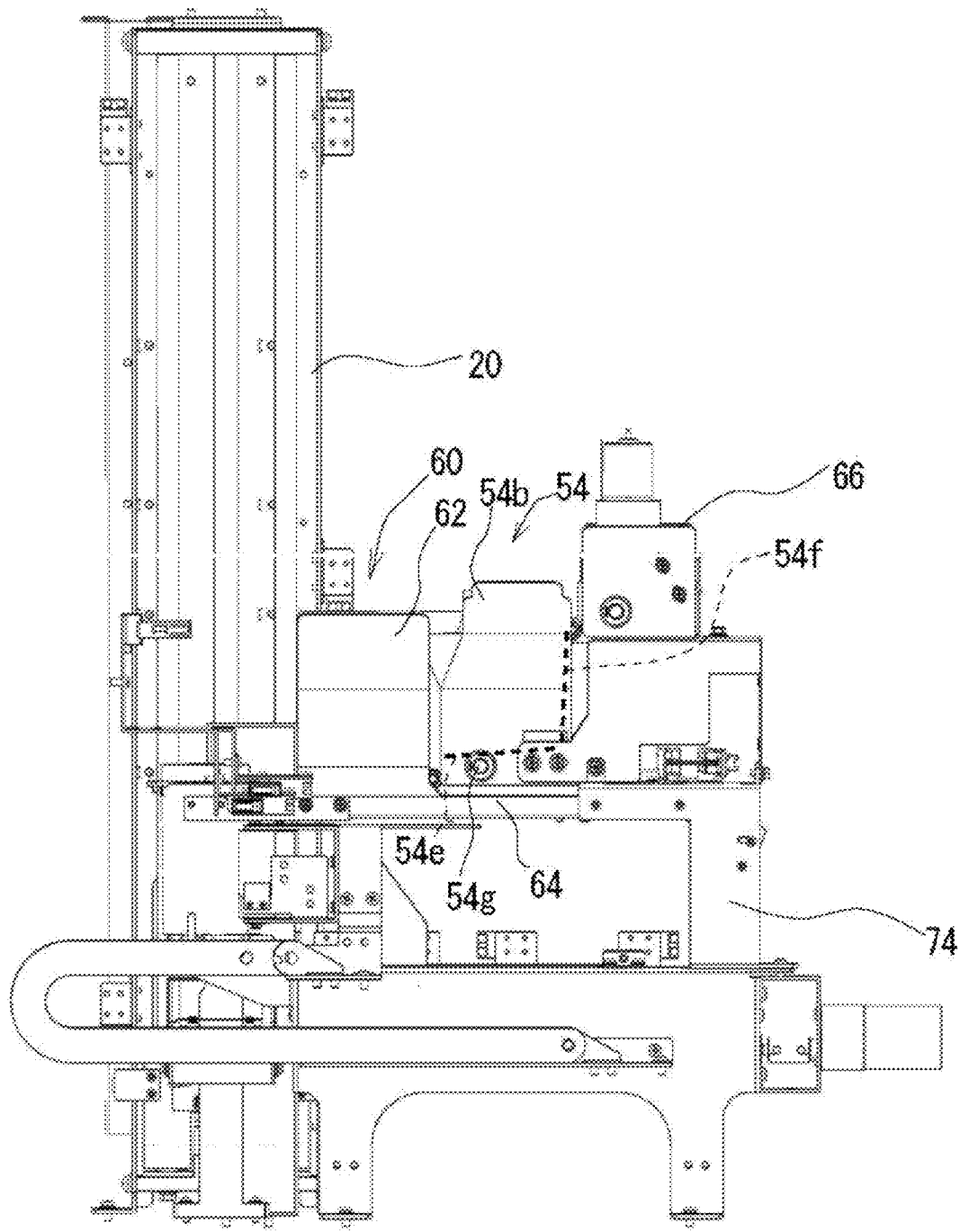
FIG. 19 is an explanatory diagram explaining about an example of another form of the medicine filling device of this invention.

In the above mentioned embodiment, the metal plate which composes the bottle receiving material 62, is illustrated by bending the boundary portion of the inner wall surface '62 c' of the supply portion, the inner wall surface '62 b' of the passage portion or the inner wall surface '62 a' of the receiving portion, but this invention should not have restrictions, and for example, it can be made as shown in FIG. 18, where in, by making it curve in the R form, each portion can be smoothly connected with the relevant portion. In this case, as shown in FIG. 18, the inclination between the upper edge and the lower edge of the inner wall surface '62 b' of the passage portion, is formed so that it is closer to vertical than that compared to the inclination between the upper edge and the lower edge of the inner wall surface '62 a' of the receiving portion, and by following a process similar to the one mentioned above, the vial container B is smoothly made into a standing state, and it can be supplied to the subsequent process by making its opening turn towards the upward direction.

The medicine filling device 10 which is described above, can regulate the gap between the bottle receiving material 62, 62, and the arm 64, 64, depending on the size of the vial container to be supplied, by operating the drive mechanism 66, which is designed in the supply means 60, due to which it is possible to adjust the size of the supply port 69 and the passage width of the vial container passage 68. Therefore, if the composition is done as mentioned above then, it is possible to handle the various sizes of the vial container B. Further, if the configuration is as done above, then, there is no need to fix the size of the vial container B which is kept ready in the stocker 42, 42. In other words, it is alright if a vial container B of a large size is kept ready in the stocker 42 on the side of the side surface '12 b', while a small vial container B is kept ready in another stocker 42, and it is also alright if a small vial container B is kept ready in the stocker 42 on the side of the side surface '12 b', while a large vial container B is kept ready on the other stocker 42, in this invention.

In the above mentioned form, by bending and processing a single metal plate, the case when the vial container 62 is formed in an integrated manner is illustrated, but this invention should not have restrictions, for example, as shown in FIG. 18, the portion which forms the inner wall surface '62 a' of the receiving portion, and the inner wall surface '62 b' of the passage portion, and the portion which composes the inner wall surface '62 c' of the receiving portion, are all composed of different—different materials. Further, if each of the portions which form the container receiving material 62, is composed of different materials, then it is preferred that the vial container B is placed between the gap which is formed between the inner wall surface '62 a' of the receiving portion, or the inner wall surface '62 b' of the passage portion, and the inner wall surface '62 c' of the supply portion, so that the vial container B is prevented from colliding in between, and it is alright if the gap which is formed is to an extent that the vial container B does not cause a collusion.

What is claimed is:

1. A medicine filling device comprising:
  a vial container moving from the upward direction to downward direction in the device;
  a vial container passage having a taper in the direction of the passage width from a region in the upper side to a region in the lower side;
  a receiving portion receiving the vial container;
  a receiving passage formed in the lower direction of the receiving portion, where the vial container passes from the receiving portion;
  a supply portion formed at the lower side of the receiving passage, which discharges the vial container from the receiving passage to a subsequent process;
  a port formed in the supply portion by facing in the downward direction for supplying the vial container, wherein the width of the vial container passage is greater than a width of the port, and a tapering ratio of the receiving passage is smaller than a tapering ratio of the receiving portion; and
  a pair of passage structures facing the opposite direction of each other, wherein:
    the vial container passage is formed between the pair of passage structures,
    the pair of passage structures have the receiving portions,
    the receiving passages have different inclinations from the receiving portion, and
    the supply portions have different inclinations from the receiving passage.

2. The medicine filling device of claim 1: wherein the receiving portion and the receiving passage have a bent inner wall at the boundary of the receiving portion and the receiving passage; and
  wherein the receiving passage has an inclination surface being nearer to vertical than the inclination of the upper and lower edge of the receiving portion.

3. A medicine filling device comprising:
  a vial container moving from the upward direction to downward direction in the device;
  a vial container passage having a taper in the direction of the passage width from a region in the upper side to a region in the lower side;
  a receiving portion receiving the vial container;

a receiving passage formed in the lower direction of the receiving portion, where the vial container passes from the receiving portion;

a supply portion formed at the lower side of the receiving passage, which discharges the vial container from the receiving passage to a subsequent process;

a port formed in the supply portion by facing in the downward direction for supplying the vial container, wherein the width of the vial container passage is greater than a width of the port, and an inclination between the upper edge and the lower edge of the receiving passage is closer to vertical than the inclination between the upper edge and the lower edge of the receiving portion; and a pair of passage structures facing the opposite direction of each other, wherein:
  the vial container passage is formed between the pair of passage structures,
  the pair of passage structures have the receiving portions,
  the receiving passages have different inclinations from the receiving portion, and
  the supply portions have different inclinations from the receiving passage.

4. The medicine filling device of claim 1, wherein the supply portion has a guide, which tapers from the side of the receiving passage to the port.

5. The medicine filling device of claim 1, wherein the pair of passage structures make adjustment to a width of the vial container passage by increasing or decreasing the distance between the pair of passage structures, and the adjustment is set by the size of the vial container being supplied from the supply portion.

6. The medicine filling device of claim 3, wherein the supply portion has a guide, which tapers from the side of the receiving passage to the port.

7. The medicine filling device of claim 3, wherein the pair of passage structures make adjustment to a width of the vial container passage by increasing or decreasing the distance between the pair of passage structures, and the adjustment is set by the size of the vial container being supplied from the supply portion.

* * * * *